US012243484B2

(12) United States Patent
Lee et al.

(10) Patent No.: US 12,243,484 B2
(45) Date of Patent: Mar. 4, 2025

(54) DISPLAY APPARATUS AND METHOD OF DRIVING PIXEL

(71) Applicant: Samsung Display Co., Ltd., Yongin-si (KR)

(72) Inventors: Jaehoon Lee, Yongin-si (KR); Byunghyuk Shin, Yongin-si (KR); Joosun Yoon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/612,223

(22) Filed: Mar. 21, 2024

(65) Prior Publication Data

US 2024/0321208 A1 Sep. 26, 2024

(30) Foreign Application Priority Data

Mar. 24, 2023 (KR) ........................ 10-2023-0039167
May 3, 2023 (KR) ........................ 10-2023-0057825

(51) Int. Cl.
*G09G 3/3233* (2016.01)

(52) U.S. Cl.
CPC ..................... *G09G 3/3233* (2013.01); *G09G 2300/0452* (2013.01); *G09G 2330/021* (2013.01)

(58) Field of Classification Search
CPC ......... G09G 3/3233; G09G 2300/0452; G09G 2330/021
See application file for complete search history.

(56) References Cited

U.S. PATENT DOCUMENTS

| | | | |
|---|---|---|---|
| 9,721,498 B2 | 8/2017 | Jeon | |
| 10,937,370 B2 | 3/2021 | Son | |
| 11,211,011 B2 | 12/2021 | Kim et al. | |
| 11,417,278 B2 | 8/2022 | Ahn et al. | |
| 11,436,984 B2 | 9/2022 | Park et al. | |
| 2020/0135074 A1* | 4/2020 | Wooster | G09G 3/006 |
| 2020/0135098 A1* | 4/2020 | Tan | G09G 3/3225 |
| 2020/0135105 A1* | 4/2020 | Lu | H01L 27/1214 |
| 2020/0135114 A1* | 4/2020 | Lee | G09G 3/3233 |
| 2020/0135115 A1* | 4/2020 | Chang | G09G 3/3266 |
| 2020/0135148 A1* | 4/2020 | Bai | G09G 3/20 |

(Continued)

FOREIGN PATENT DOCUMENTS

| | | |
|---|---|---|
| KR | 10-2015-0054210 | 5/2015 |
| KR | 10-2017-0129508 | 11/2017 |

(Continued)

*Primary Examiner* — Sejoon Ahn
(74) *Attorney, Agent, or Firm* — KILE PARK REED & HOUTTEMAN PLLC

(57) ABSTRACT

A display apparatus includes pixels, each of the pixels including a light-emitting diode, a first transistor connected to a driving voltage line and the light-emitting diode, a second transistor connected to the first transistor and the light-emitting diode, a third transistor connected to the second transistor and a first initialization voltage line, and a fourth transistor connected to the light-emitting diode and a second initialization voltage line. During a frame, each of the pixels operates in a first scan period and a second scan period. The first scan period includes a write-period in which a data signal is supplied and a first emission period in which the pixel is configured to emit light at a brightness corresponding to the data signal.

20 Claims, 22 Drawing Sheets

(56) References Cited

U.S. PATENT DOCUMENTS

| | | | | |
|---|---|---|---|---|
| 2020/0135814 | A1* | 4/2020 | Park | H10K 59/121 |
| 2021/0057502 | A1 | 2/2021 | Kim et al. | |
| 2022/0093705 | A1 | 3/2022 | Kim et al. | |
| 2022/0180812 | A1 | 6/2022 | Lin et al. | |
| 2023/0130226 | A1 | 4/2023 | Kim et al. | |

FOREIGN PATENT DOCUMENTS

| | | |
|---|---|---|
| KR | 10-2019-0087695 | 7/2019 |
| KR | 10-2020-0057204 | 5/2020 |
| KR | 10-2020-0085962 | 7/2020 |
| KR | 10-2020-0142646 | 12/2020 |
| KR | 10-2021-0022807 | 3/2021 |
| KR | 10-2021-0085875 | 7/2021 |
| KR | 10-2021-0124599 | 10/2021 |

* cited by examiner

DISPLAY APPARATUS AND METHOD OF DRIVING PIXEL

CROSS-REFERENCE TO RELATED APPLICATIONS

This application is based on and claims priority under 35 U.S.C. § 119 to Korean Patent Application Nos. 10-2023-0039167, filed on Mar. 24, 2023, and 10-2023-0057825, filed on May 3, 2023, in the Korean Intellectual Property Office, the disclosures of which are incorporated by reference herein in their entireties.

BACKGROUND

1. Technical Field

One or more embodiments relate to a pixel and a display apparatus including the same.

2. Description of the Related Art

Recently, the usage of display apparatuses has diversified. As display apparatuses have become thinner and lighter, their range of use has gradually been extended.

As display apparatuses are used in various ways, there may be various methods of designing the shape of a display apparatus, and also, functions that may be combined or associated with a display apparatus have increased.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

One or more embodiments include a display apparatus with improved display quality. However, this is just an example, and the disclosure is not limited thereto.

Additional aspects will be set forth in part in the description which follows and, in part, will be apparent from the description, or may be learned by practice of the embodiments of the disclosure.

According to one or more embodiments, a display apparatus may include a plurality of pixels, wherein each of the plurality of pixels may include: a light-emitting diode; a first transistor electrically connected to a driving voltage line and the light-emitting diode; a second transistor electrically connected to the first transistor and the light-emitting diode; a third transistor electrically connected to the second transistor and a first initialization voltage line; and a fourth transistor electrically connected to the light-emitting diode and a second initialization voltage line, and wherein: during a frame, each of the plurality of pixels may operate in a first scan period and a second scan period, wherein the first scan period may include a write-period in which a data signal may be supplied and a first emission period in which each of the plurality of pixels may be configured to emit light at a brightness corresponding to the data signal, wherein the second scan period may include a second emission period in which the data signal may be maintained and each of the plurality of pixels may be configured to emit light at a brightness corresponding to the data signal, during the second scan period, the third transistor may be supplied with a first initialization voltage from the first initialization voltage line, and the fourth transistor may be supplied with a second initialization voltage from the second initialization voltage line, and during the second scan period, a magnitude of the first initialization voltage and a magnitude of the second initialization voltage may be equal to a first voltage.

During the first scan period, the magnitude of the first initialization voltage may be a second voltage, and, during the first scan period, the magnitude of the second initialization voltage may be a third voltage, and a magnitude of the second voltage may be different from a magnitude of the third voltage.

During the second scan period, the first voltage, which is the magnitude of each of the first initialization voltage and the second initialization voltage, may be between the second voltage and the third voltage.

During a first period between the write-period and the first emission period, each of the plurality of pixels may be configured to receive a second gate signal of an on-voltage through a gate of the third transistor and a gate of the fourth transistor.

A second gate signal of a gate-on voltage may be supplied to gates of the third transistor and the fourth transistor in a second period before the second emission period during the second scan period.

Each of the plurality of pixels may further include a fifth transistor electrically connected to a data line and to a gate of the first transistor, and during the write-period, a third gate signal of a gate-on voltage may be supplied to a gate of the fifth transistor.

Each of the plurality of pixels may further include: a sixth transistor electrically connected to the driving voltage line and the first transistor; and a seventh transistor electrically connected to a gate of the first transistor and a reference voltage line, and in a third period before the write-period during the first scan period, a first gate signal of a gate off-voltage may be supplied to a gate of the second transistor, a fourth gate signal of a gate-on voltage may be supplied to a gate of the sixth transistor, and a fifth gate signal of a gate-on voltage may be supplied to a gate of the seventh transistor.

During the second scan period, a first gate signal of a gate-on voltage may be supplied to a gate of the second transistor.

Each of the plurality of pixels may further include a sixth transistor electrically connected to the driving voltage line and the first transistor, a fourth gate signal of a gate-on voltage may be supplied to a gate of the sixth transistor in the second emission period during the second scan period, and a fourth gate signal of a gate off-voltage may be supplied to a gate of the sixth transistor in a period other than the second emission period.

The plurality of pixels may include a first pixel configured to emit light of a first color, and a second pixel configured to emit light of a second color, and magnitudes of a first initialization voltage and a second initialization voltage supplied to the first pixel may be different from magnitudes of a first initialization voltage and a second initialization voltage supplied to the second pixel.

Each of the plurality of pixels may further include a sixth transistor electrically connected to the driving voltage line and the first transistor, and a fourth gate signal of a gate-on voltage may be supplied to a gate of the sixth transistor during the second scan period.

The plurality of pixels may include a first pixel configured to emit light of a first color, and a second pixel configured to emit light of a second color, and magnitudes of a first initialization voltage and a second initialization voltage supplied to the first pixel may be different from magnitudes of a first initialization voltage and a second initialization voltage supplied to the second pixel.

The display apparatus may further include a sixth transistor electrically connected to the driving voltage line and the first transistor, wherein a fourth gate signal of a gate-on voltage may be supplied to a gate of the sixth transistor during the second scan period.

A first gate signal of a gate-on voltage may be supplied to a gate of the second transistor in the second emission period during the second scan period, and a first gate signal of a gate-off voltage may be supplied to a gate of the second transistor in a period other than the second emission period.

According to one or more embodiments, a method of driving a pixel, wherein the pixel may include: a light-emitting diode; a first transistor electrically connected to a driving voltage line and the light-emitting diode; a second transistor electrically connected to the first transistor and the light-emitting diode; a third transistor electrically connected to the second transistor and a first initialization voltage line; and a fourth transistor electrically connected to the light-emitting diode and a second initialization voltage line, wherein a frame may include a first scan period including a write-period in which a data signal may be supplied and a first emission period in which the pixel may be configured to emit light at a brightness corresponding to the data signal, and a second scan period including a second emission period in which the data signal may be maintained and the pixel may be configured to emit light at a brightness corresponding to the data signal, the method comprising supplying a first gate signal of a gate-on voltage to a gate of the second transistor during the second scan period, supplying a first initialization voltage from the first initialization voltage line to a third transistor, supplying a second initialization voltage from the second initialization voltage line during the second scan period to a fourth transistor, wherein a magnitude of the first initialization voltage and a magnitude of the second initialization voltage may be equal to a first voltage during the second scan period.

The pixel may further include a sixth transistor electrically connected to the driving voltage line and the first transistor, the method may further comprise supplying a third gate signal of a gate-on voltage to a gate of the sixth transistor in the second emission period during the second scan period, and a third gate signal of a gate-off voltage may be supplied to a gate of the sixth transistor in a period other than the second emission period.

The method may further comprise supplying a second gate signal of a gate-on voltage to a gate of the third transistor and a gate of the fourth transistor in a first period between the write-period and the first emission period during the first scan period.

A magnitude of the first initialization voltage may be a second voltage during the first scan period, a magnitude of the second initialization voltage may be a third voltage during the first scan period, and the second voltage may be different from the third voltage.

During the second scan period, the first voltage, which is the magnitude of each of the first initialization voltage and the second initialization voltage, may be between the second voltage and the third voltage.

The technical objectives to be achieved by the disclosure are not limited to those described herein, and other technical objectives that are not mentioned herein would be clearly understood by a person skilled in the art from the description of the disclosure.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1A:
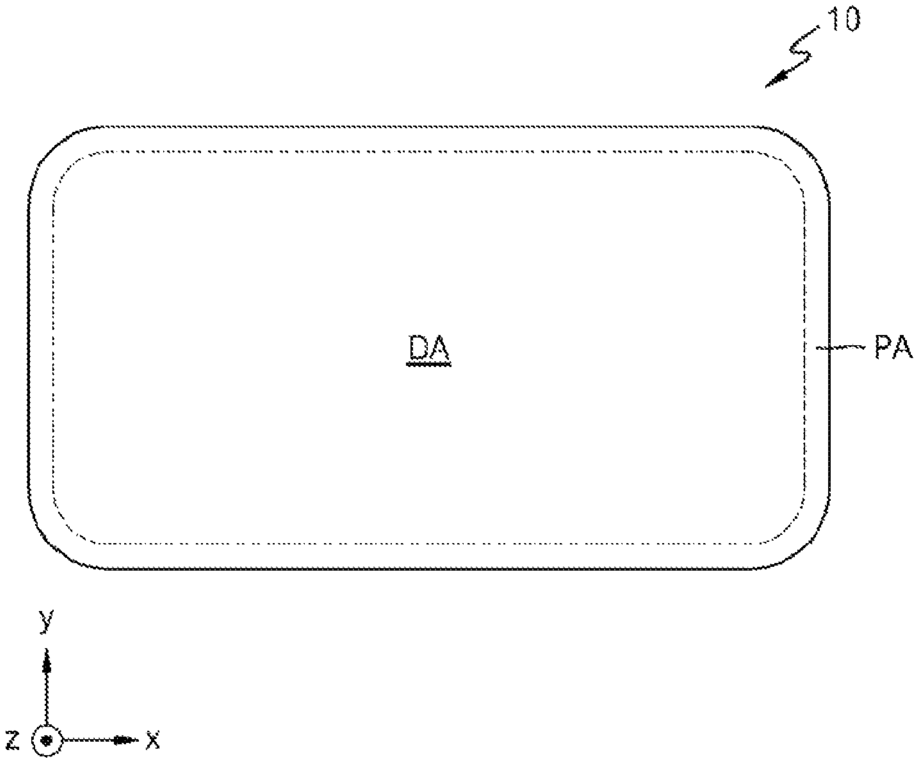
FIGS. 1A and 1B are schematic views of a display apparatus according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

As the disclosure allows for various changes and numerous embodiments, certain embodiments will be illustrated in the drawings and described in the written description. Effects and features of the disclosure, and methods for achieving them will be clarified with reference to embodiments described below in detail with reference to the drawings. However, the disclosure is not limited to the following embodiments and may be embodied in various forms.

Hereinafter, embodiments will be described with reference to the accompanying drawings, wherein like numbers and/or reference characters refer to like elements throughout and a repeated description thereof is omitted. It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The singular forms "a," "an," and "the" as used herein are intended to include the plural forms as well unless the context clearly indicates otherwise.

The terms "comprises," "comprising," "includes," and/or "including," "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

It will be understood that when an element (or a region, a layer, a portion, or the like) is referred to as "being on," "disposed on," "connected to," or "coupled to" another element in the specification, it can be directly disposed on, connected or coupled to another element mentioned above, or intervening elements may be disposed therebetween. It will be understood that the terms "connected to" or "coupled to" may include a physical or electrical connection or coupling.

Sizes of elements in the drawings may be exaggerated or reduced for convenience of explanation, ease of description and for clarity. As an example, the size and thickness of each element shown in the drawings are arbitrarily represented for convenience of description, and thus, the disclosure is not necessarily limited thereto.

In case that an embodiment may be implemented differently, a process order may be performed in differently from the described order. As an example, two processes successively described may be simultaneously performed substantially and performed in the opposite order.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

The terms "overlap," "overlapping," or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

When an element is described as "not overlapping" or "to not overlap" another element, this may include that the elements are spaced apart from each other, offset from each other, or set aside from each other or any other suitable term as would be appreciated and understood by those of ordinary skill in the art.

The phrase "in a plan view" means viewing the object from the top, and the phrase "in a schematic cross-sectional view" means viewing a cross-section of which the object is vertically cut from the side. Hence, the expression "in a plan view" used herein may mean that an object is viewed in the third direction z from the top. The phrase "in a schematic cross-sectional view" means viewing a cross-section in the first direction x or the second direction y of which the object is vertically cut from the side. The direction z also can be referred to as a "thickness direction".

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

In case that an element is referred to as being "in contact" or "contacted" or the like to another element, the element may be in "electrical contact" or in "physical contact" with another element; or in "indirect contact" or in "direct contact" with another element.

It will be understood that when a layer, region, or element is referred to as being "connected" to another layer, region, or element, it may be "directly connected" to the other layer, region, or element or may be "indirectly connected" to the other layer, region, or element with another layer, region, or element located therebetween. For example, it will be understood that when a layer, region, or element is referred to as being "electrically connected" to another layer, region, or element, it may be "directly electrically connected" to the other layer, region, or element or may be "indirectly electrically connected" to the other layer, region, or element with another layer, region, or element interposed therebetween.

The phrase "X is electrically connected to "Y" means that at least one element (e.g., a switch, a transistor, a capacitance element, an inductor, a resistance element, a diode, and the like) enabling electrical connection between X and Y is electrically connected between X and Y.

In embodiments described below, "ON" used in association with an element state may denote an active state of an element, and "OFF" may denote an inactive state of an element. "ON" used in association with a signal received by an element may denote a signal activating the element, and "OFF" may denote a signal inactivating the element. An element may be activated by a high-level voltage or a low-level voltage. As an example, a P-channel transistor (a P-type transistor) may be activated by a low-level voltage, and an N-channel transistor (an N-type transistor) may be activated by a high-level voltage. Accordingly, it should be understood that "ON" voltages for a P-type transistor and an N-type transistor are opposite (low vs. high) voltage levels. The reference to "high-level voltage" and "low-level voltage" is solely to distinguish that the "high-level voltage" has a voltage value that is higher than the "low-level" voltage (in absolute value terms) relative to zero volts, and should not be interpreted to represent any particular value, degree or extent of either voltage value.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different orientations that are not perpendicular to one another.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A description that a component is "configured to" perform a specified operation may be defined as a case where the component is constructed and arranged with structural features that can cause the component to perform the specified operation.

Embodiments may be described and illustrated in the accompanying drawings in terms of functional blocks, units, and/or modules.

Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies.

In the case of the blocks, units, and/or modules being implemented by microprocessors or other similar hardware, they may be programmed and controlled using software (for example, microcode) to perform various functions discussed herein and may optionally be driven by firmware and/or software.

It is also contemplated that each block, unit, and/or module may be implemented by dedicated hardware, or as a combination of dedicated hardware to perform some functions and a processor (for example, one or more programmed microprocessors and associated circuitry) to perform other functions.

Each block, unit, and/or module of embodiments may be physically separated into two or more interacting and discrete blocks, units, and/or modules without departing from the scope of the disclosure.

Further, the blocks, units, and/or modules of embodiments may be physically combined into more complex blocks, units, and/or modules without departing from the scope of the disclosure.

A display apparatus according to embodiments may be used as a display screen of various products including televisions, notebook computers, monitors, advertisement boards, Internet of things (IoTs) as well as portable electronic apparatuses including mobile phones, smartphones, tablet personal computers (PCs), mobile communication terminals, electronic organizers, electronic books, portable multimedia players (PMPs), navigations, and ultra mobile personal computers (UMPCs). A display apparatus 10 according to an embodiment also may be used in wearable devices including smartwatches, watchphones, glasses-type displays, and head-mounted displays (HMDs). In an embodiment, the display apparatus 10 may be used as a display screen in instrument panels for automobiles, center fascias for automobiles, or center information displays (CIDs) arranged on a dashboard, room mirror displays that replace side mirrors of automobiles, and displays of an entertainment system arranged on the backside of front seats for backseat passengers in automobiles. A display apparatus may be a flexible apparatus.

Figure 1B:
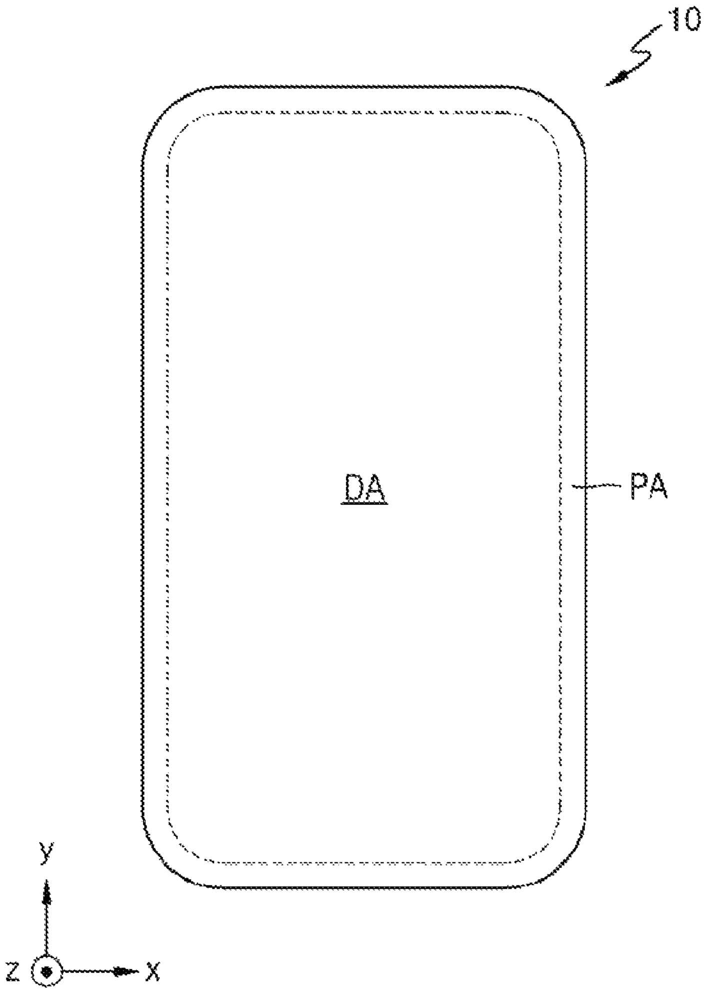
Figure 2:
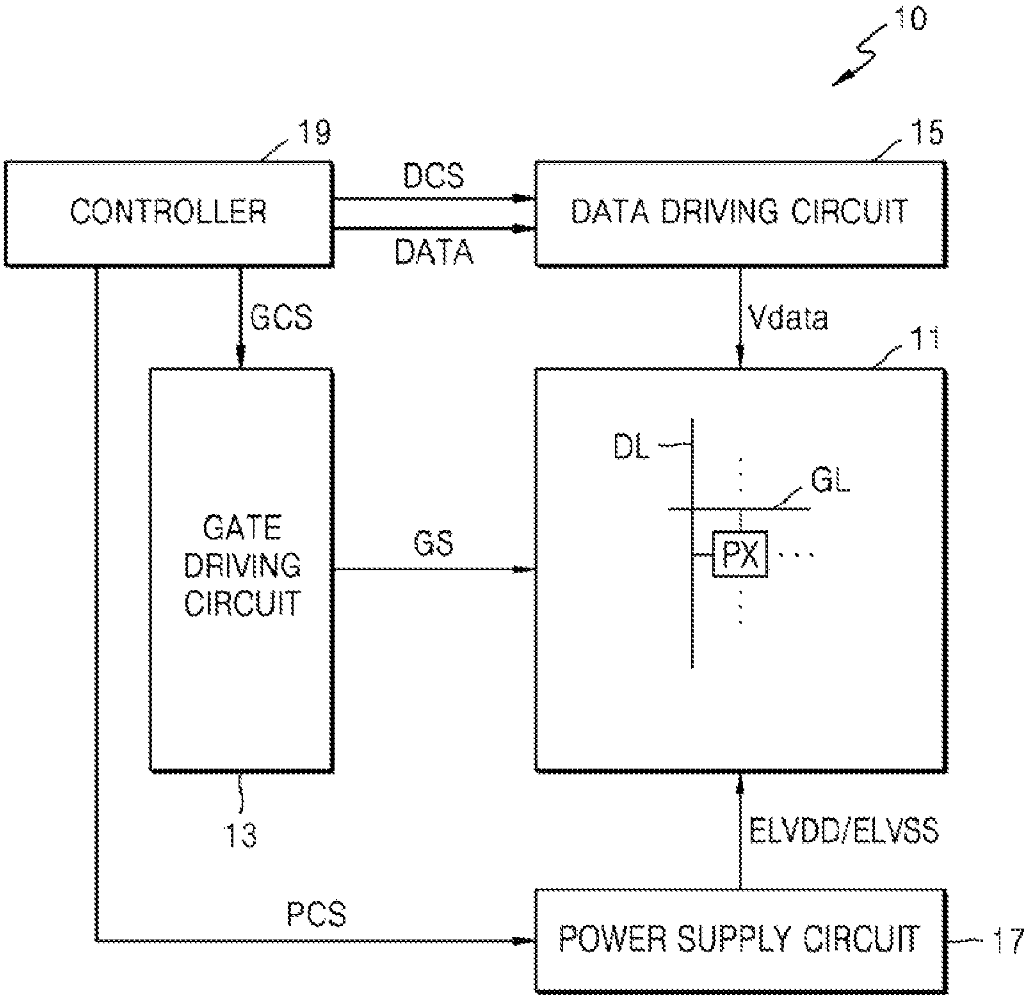
FIG. 2 is a schematic view of a display apparatus according to an embodiment.
Figure 3A:
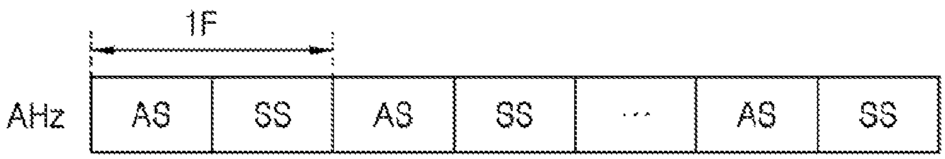
FIGS. 3A and 3B are conceptual views for explaining a method of driving a display apparatus according to driving frequencies.
Figure 3B:
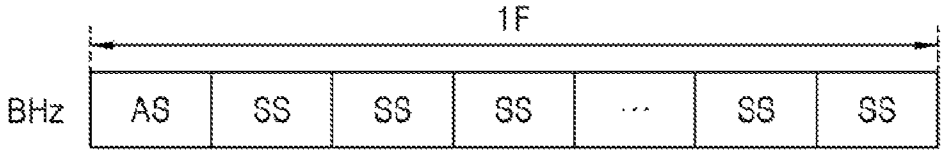

FIGS. 1A and 1B are schematic views of the display apparatus 10 according to an embodiment. FIG. 2 is a schematic view of the display apparatus 10 according to an embodiment. FIGS. 3A and 3B are conceptual views for explaining a method of driving the display apparatus 10 according to driving frequencies.

Referring to FIGS. 1A and 1B, the display apparatus 10 may include a display area DA configured to display images and a peripheral area PA outside the display area DA. The display area DA may be surrounded by the peripheral area PA entirely.

In a plan view, the display area DA may be provided in a rectangular shape. In an embodiment, the display area DA may be provided in a polygonal shape such as a triangle, a pentagon, a hexagon, and the like, a circular shape, an elliptical shape, an irregular shape, or the like. The corner of the edge of the display area DA may have a round shape. In an embodiment, the display apparatus 10 may have the display area DA of a shape in which a length in an x direction may be greater than a length in a y direction as shown in FIG. 1A. In an embodiment, the display apparatus 10 may have the display area DA of a shape in which a length in the y direction may be greater than a length in the x direction as shown in FIG. 1B.

Referring to FIG. 2, the display apparatus 10 according to an embodiment may include a pixel portion 11, a gate driving circuit 13, a data driving circuit 15, a power supply circuit 17, and a controller 19.

The pixel portion 11 may be provided in the display area DA. Various conductive lines configured to transfer electrical signals to be applied to the display area DA, outer circuits electrically connected to pixel circuits, and pads to which a printed circuit board or a driver integrated circuit (IC) chip is attached may be located in the peripheral area PA. As an example, the gate driving circuit 13, the data driving circuit 15, the power supply circuit 17, and the controller 19 may be provided in the peripheral area PA.

As shown in FIG. 2, a display area DA may comprise gate lines GL, data lines DL, and pixels PX electrically connected thereto. The pixels PX may be arranged in various configurations such as a stripe configuration, a PenTile® configuration, a diamond configuration, a mosaic configuration, and the like to display images. Each pixel PX may include an organic light-emitting diode OLED as a display element (a light-emitting element), and the organic light-emitting diode OLED may be electrically connected to a pixel circuit. The pixel circuit may include transistors and at least one capacitor. The pixel PX may be configured to emit, for example, red, green, blue, or white light from the organic light-emitting diode OLED. Each pixel PX may be electrically connected to at least one corresponding gate line among the gate lines GL and at least one corresponding data line among the data lines DL.

The gate lines GL may each extend in the x direction (a row direction) and be electrically connected to the pixels PX arranged in the same row. The gate lines GL may each be configured to transfer gate signals GS to the pixels PX in the same row. The data lines DL may each extend in the y direction (a column direction) and be electrically connected to the pixels PX arranged in the same column. The data line DL may each be configured to transfer data signals to each of the pixels PX in the same column in synchronization with a gate signal GS.

In an embodiment, the peripheral area PA may be a kind of non-display area in which the pixels PX are not arranged. In an embodiment, a portion of the peripheral area PA may be implemented as the display area DA. As an example, a pixels PX may be arranged in at least one corner of the peripheral area PA to overlap the gate driving circuit 13. Accordingly, a dead area may be reduced and the display area DA may be extended. The term "dead area" refers to a space in the peripheral area PA which is devoted to accommodating one or more components that, either singularly or plurally, perform an intended function.

The gate driving circuit 13 may be electrically connected to the gate lines GL, configured to generate gate signals GS according to control signals GCS from the controller 19, and sequentially supply the gate signals GS to the gate lines GL. The gate line GL may be electrically connected to a gate of a transistor included in the pixel PX. A gate signal GS may be a gate control signal of controlling turn-on and turn-off of a transistor whose gate is electrically connected to the gate line GL. A gate signal GS may be a square wave including an on-voltage by which a transistor may be turned on, and an off-voltage by which a transistor may be turned off.

Although FIG. 2 illustrates that the pixel PX may be electrically connected to a gate line GL, this is an example. The pixel PX may be electrically connected to two or more gate lines, and the gate driving circuit 13 may be configured to supply two or more gate signals GS having different timings at which a turn-on voltage may be applied, to the corresponding gate lines.

The data driving circuit 15 may be electrically connected to the data lines DL and configured to supply data signals to the data lines DL according to control signals DCS from the controller 19. The data signals supplied to the data lines DL may be supplied to the pixels PX to which gate signals GS are supplied. The data driving circuit 15 may be configured to convert input image data DATA into a data signal of a voltage or current form, wherein the input image data DATA has a grayscale and may be input from the controller 19. FIG. 2 shows an example in which the data driving circuit 15 may be configured to output data signals Vdata of a voltage form.

The power supply circuit 17 may be configured to generate voltages required to drive the pixels according to control signals PCS from the controller 19. The power supply circuit 17 may be configured to generate a first driving voltage ELVDD and a second driving voltage ELVSS and supply the same to the pixels PX. The first driving voltage ELVDD may be a high-level voltage provided to a first electrode (a pixel electrode or an anode) of a display element included in a pixel PX. The second driving voltage ELVSS may be a low-level voltage provided to a second electrode (an opposite electrode or a cathode) of a display element included in a pixel PX.

The controller 19 may be configured to generate control signals GCS, DCS, and PCS based on signals input from the outside, and supply the same to the gate driving circuit 13, the data driving circuit 15, and the power supply circuit 17. Control signals GCS output to the gate driving circuit 13 may include clock signals and a gate start signal. Control signals DCS output to the data driving circuit 15 may include a source start signal and clock signals.

The display apparatus 10 may include a display panel, and the display panel may include a substrate. The pixels PX may be arranged in the display area DA of the substrate. A portion or all of the gate driving circuit 13 may be directly formed in the peripheral area PA of the substrate during a process of forming a transistor configuring the pixel circuit in the display area DA of the substrate. The data driving circuit 15, the power supply circuit 17, and the controller 19 may be formed as separate integrated circuit chips, respectively, or as a single integrated circuit chip, and disposed on a flexible printed circuit board (FPCB) electrically connected to a pad arranged on a side of the substrate. In an embodiment, the data driving circuit 15, the power supply circuit 17, and the controller 19 may be directly disposed on the substrate using a chip-on-glass (COG) or chip-on-plastic (COP) method.

The display apparatus 10 may support a variable refresh rate (VRR). The refresh rate is a frequency at which a data signal may be substantially written on a driving transistor of a pixel PX, and also called a screen scan rate, a screen reproduction rate. The refresh rate may represent the number of image frames reproduced per second. In an embodiment, the refresh rate may be an output frequency of the gate driving circuit 13 and/or the data driving circuit 15. A frequency corresponding to the refresh rate may be a driving frequency. The display apparatus 10 may be configured to adjust an output frequency of the gate driving circuit 13 and an output frequency of the data driving circuit 15 corresponding thereto according to the driving frequency. The display apparatus 10 supporting the VRR may be configured to operate by changing the driving frequency within a range between a maximum driving frequency and a minimum driving frequency. As an example, in case that the refresh rate is about 60 Hz, a gate signal GS for writing a data signal from the gate driving circuit 13 may be supplied to each horizontal line (row) 60 times per second. The display apparatus 10 may be configured to display images while changing the driving frequency according to the refresh rate.

According to the driving frequency, a frame 1F may include a first scan period AS and one or more second scan periods SS. As an example, as shown in FIG. 3A, in the display apparatus 10 that may operate in a driving frequency of an A Hz, a frame 1F may include a first scan period AS and a second scan period SS. As shown in FIG. 3B, in the display apparatus 10 that may operate in a driving frequency of a B Hz less than a driving frequency of an A Hz, a frame 1F may include a first scan period AS and two or more second scan periods SS. In case that the driving frequency is reduced, the number of scan periods may increase and the length of a frame 1F may increase. In an embodiment, a frame 1F may include only one first scan period AS.

The first scan period AS may be defined as an address scan period in which a data signal may be written in a pixel PX according to a first gate signal GW, and accordingly, the pixel PX may be configured to emit light. An operation in which a data signal may be written in the pixel PX from the data line DL may be referred to as a data programming operation. The second scan period SS may be defined as a self-scan period in which a first gate signal GW is not applied to a pixel PX, and accordingly, a data signal is not written. During the second scan period SS, a data signal written in the first scan period AS is maintained and a pixel PX may be configured to emit light. The length of the second scan period SS may be equal to the length of the first scan period AS.

Figure 4:
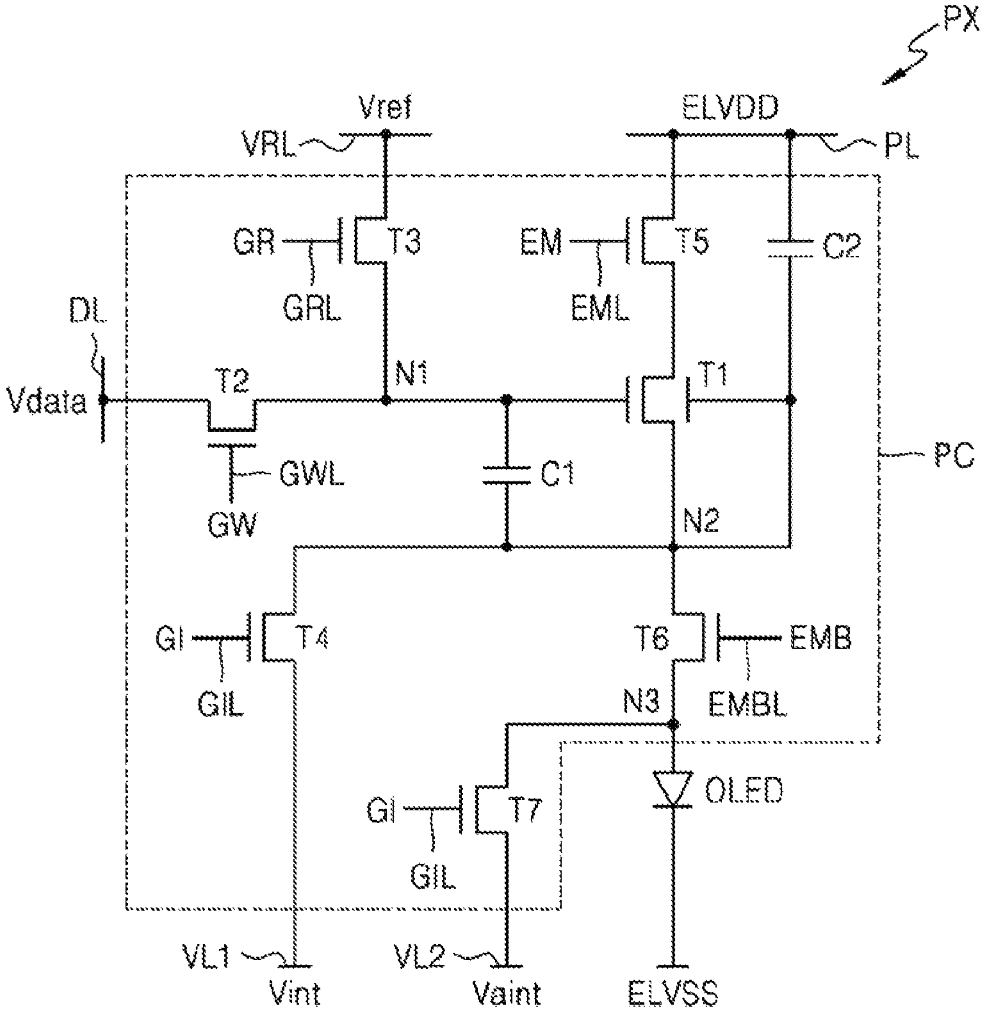
FIG. 4 is a schematic diagram of an equivalent circuit of a pixel according to an embodiment.

FIG. 4 is a schematic diagram of an equivalent circuit of a pixel PX according to an embodiment.

Referring to FIG. 4, the pixel PX may include an organic light-emitting diode OLED, as a display element, and a pixel circuit PC electrically connected to the organic light-emitting diode OLED. The pixel circuit PC may include first to seventh transistors T1, T2, T3, T4, T5, T6, and T7, and first and second capacitors C1 and C2. The first transistor T1 may be a driving transistor configured to output a driving current corresponding to a data signal, and the second to seventh transistors T2, T3, T4, T5, T6, and T7 may be switching transistors configured to transfer signals. A first terminal (a first electrode) and a second terminal (a second electrode) of each of the first to the seventh transistors T1, T2, T3, T4, T5, T6, and T7 may be a source or a drain depending on the voltage of the first terminal and the second terminal. As an example, the first terminal may be a drain and the second terminal may be a source, or the first terminal may be a source and the second terminal may be a drain depending on the voltage of the first terminal and the second terminal. A node to which a first gate of the first transistor T1 is electrically connected may be defined as a first node N1, and a node to which a second terminal of the first transistor T1 is electrically connected may be defined as a second node N2.

A pixel PX may be electrically connected to a first gate line GWL configured to transfer a first gate signal GW, a second gate line GIL configured to transfer a second gate signal GI, a third gate line GRL configured to transfer a third gate signal GR, a fourth gate line EML configured to transfer a fourth gate signal EM, a fifth gate line EMBL configured to transfer a fifth gate signal EMB, and a data line DL configured to transfer a data signal Vdata. Because light emission of the pixel PX may be controlled by the fourth gate signal EM and the fifth gate signal EMB, the fourth gate signal EM and the fifth gate signal EMB may be referred to as emission control signals, and the fourth gate line EML and the fifth gate line EMBL may be referred to as emission control lines.

The pixel PX may be electrically connected to a driving voltage line PL configured to transfer the first driving voltage ELVDD, a reference voltage line VRL configured to transfer a reference voltage Vref, a first initialization voltage line VL1 configured to transfer a first initialization voltage Vint, and a second initialization voltage line VL2 configured to transfer a second initialization voltage Vaint.

The first transistor T1 may be electrically connected between the driving voltage line PL and the second node N2. The first transistor T1 may include a gate, a first terminal, and a second terminal electrically connected to the second node N2. The gate of the first transistor T1 may include a first gate electrically connected to the first node N1, and a second gate electrically connected to the second node N2. The first gate and the second gate may be disposed on different layers to face each other. As an example, the first gate and the second gate of the first transistor T1 may be disposed to face each other with a semiconductor layer therebetween.

The first gate of the first transistor T1 may be electrically connected to a second terminal of the second transistor T2, a first terminal of the third transistor T3, and the first capacitor C1. The second gate of the first transistor T1 may be electrically connected to a first terminal of the sixth transistor T6, the first capacitor C1, and the second capacitor C2. The first terminal of the first transistor T1 may be electrically connected to the driving voltage line PL through the fifth transistor T5, and the second terminal of the first transistor T1 may be electrically connected to a pixel electrode of the organic light-emitting diode OLED through the sixth transistor T6. The second terminal of the first transistor T1 may be electrically connected to a first terminal of the fourth transistor T4, a first terminal of the sixth transistor T6, the first capacitor C1, and the second capacitor C2. The first transistor T1 may receive a data signal Vdata according to a switching operation of the second transistor T2 and be configured to control the amount of driving current flowing through the organic light-emitting diode OLED.

The second transistor T2 (a data-write transistor) may be electrically connected between the data line DL and the first gate of the first transistor T1. The second transistor T2 may include a gate, a first terminal, and a second terminal, wherein the gate may be electrically connected to the first gate line GWL, the first terminal may be electrically connected to the data line DL, and the second terminal may be electrically connected to the first node N1. The second terminal of the second transistor T2 may be electrically connected to the first gate of the first transistor T1, a first terminal of the third transistor T3, and the first capacitor C1. The second transistor T2 may be turned on according to a first gate signal GW transferred to the first gate line GWL to electrically connect the data line DL to the first node N1 and transfer a data signal Vdata to the first node N1, the data signal Vdata being transferred through the data line DL.

The third transistor T3 (a first initialization transistor) may be electrically connected between the first gate of the first transistor T1 and the reference voltage line VRL. The third transistor T3 may include a gate, a first terminal, and a second terminal, wherein the gate may be electrically connected to the third gate line GRL, the first terminal may be electrically connected to the first node N1, and the second terminal may be electrically connected to the reference voltage line VRL. The first terminal of the third transistor T3 may be electrically connected to the first gate of the first transistor T1, the second terminal of the second transistor T2, and the first capacitor C1. The third transistor T3 may be turned on according to a third gate signal GR transferred to the third gate line GRL and configured to transfer the reference voltage Vref to the first node N1, the reference voltage Vref being transferred through the reference voltage line VRL.

The fourth transistor T4 (a second initialization transistor) may be electrically connected between the first transistor T1 and the first initialization voltage line VL1. The fourth transistor T4 may include a gate, a first terminal, and a second terminal, wherein the gate may be electrically connected to the second gate line GIL, the first terminal may be electrically connected to the second node N2, and the second terminal may be electrically connected to the first initialization voltage line VL1. The first terminal of the fourth transistor T4 may be electrically connected to the second terminal of the first transistor T1, a first terminal of the sixth transistor T6, the first capacitor C1, and the second capacitor C2. The fourth transistor T4 may be turned on according to a second gate signal GI transferred to the second gate line GIL and configured to transfer the first initialization voltage Vint to the second node N2, the first initialization voltage Vint being transferred through the first initialization voltage line VL1.

The fifth transistor T5 (a first emission control transistor) may be electrically connected between the driving voltage line PL and the first transistor T1. The fifth transistor T5 may include a gate, a first terminal, and a second terminal, wherein the gate may be electrically connected to the fifth gate line EML, the first terminal may be electrically connected to the driving voltage line PL, and the second terminal may be electrically connected to the first terminal of the first transistor T1. The fifth transistor T5 may be turned on or turned off according to a fifth gate signal EM transferred through the fifth gate line EML.

The sixth transistor T6 (a second emission control transistor) may be electrically connected between the first transistor T1 and the organic light-emitting diode OLED. The sixth transistor T6 may be electrically connected between the second node N2 and a third node N3. The sixth transistor T6 may include a gate, a first terminal, and a second terminal, wherein the gate may be electrically connected to the sixth gate line EMBL, the first terminal may be electrically connected to the second node N2, and the second terminal may be electrically connected to the third node N3. The first terminal of the sixth transistor T6 may be electrically connected to the second terminal of the first transistor T1, the first terminal of the fourth transistor T4, the first capacitor C1, and the second capacitor C2. The second terminal of the sixth transistor T6 may be electrically connected to the first terminal of the seventh transistor T7 and the pixel electrode of the organic light-emitting diode OLED. The sixth transistor T6 may be turned on or turned off according to a sixth gate signal EMB transferred through the sixth gate line EMBL.

The seventh transistor T7 (a third initialization transistor) may be electrically connected between the organic light-emitting diode OLED and the second initialization voltage line VL2. The seventh transistor T7 may be electrically connected between the sixth transistor T6 and the second initialization voltage line VL2. The seventh transistor T7 may include a gate, a first terminal, and a second terminal, wherein the gate may be electrically connected to the fourth gate line EML, the first terminal may be electrically connected to the third node N3, and the second terminal may be electrically connected to the second initialization voltage line VL2. The first terminal of the seventh transistor T7 may be electrically connected to the second terminal of the sixth transistor T6 and the pixel electrode of the organic light-emitting diode OLED. The seventh transistor T7 may be turned on according to a fourth gate signal EM transferred to the fourth gate line EML and configured to transfer the second initialization voltage Vaint to the third node N3, the second initialization voltage Vaint being transferred through the second initialization voltage line VL2.

The first capacitor C1 may be electrically connected between the first gate of the first transistor T1 and the second terminal of the second transistor T2. A first electrode of the first capacitor C1 may be electrically connected to the first node N1, and a second electrode of the first capacitor C1 may be electrically connected to the second node N2. The first electrode of the first capacitor C1 may be electrically connected to the first gate of the first transistor T1, the second terminal of the second transistor T2, and the first terminal of the third transistor T3. The second electrode of the first capacitor C1 may be electrically connected to the second terminal and the second gate of the first transistor T1, the second electrode of the second capacitor C2, the first terminal of the fourth transistor T4, and the first terminal of the sixth transistor T6. The first capacitor C1 is a storage capacitor and may be configured to store a threshold voltage of the first transistor T1 and a voltage corresponding to a data signal Vdata.

The second capacitor C2 may be electrically connected between the first driving voltage ELVDD and the second node N2. A first electrode of the second capacitor C2 may be electrically connected to the first driving voltage ELVDD. The second electrode of the second capacitor C2 may be electrically connected to the second terminal and the second gate of the first transistor T1, the second electrode of the first capacitor C1, the first terminal of the fourth transistor T4, and the first terminal of the sixth transistor T6. A capacitance of the first capacitor C1 may be greater than a capacitance of the second capacitor C2.

The organic light-emitting diode OLED may be electrically connected to the first transistor T1 through the sixth transistor T6. The organic light-emitting diode OLED may include the pixel electrode (the anode), the opposite electrode (the cathode), wherein the pixel electrode may be electrically connected to the third node N3, and the opposite electrode faces the pixel electrode and may be supplied with the driving voltage ELVSS. The opposite electrode may be a common electrode that is common over the pixels PX.

Figure 5:
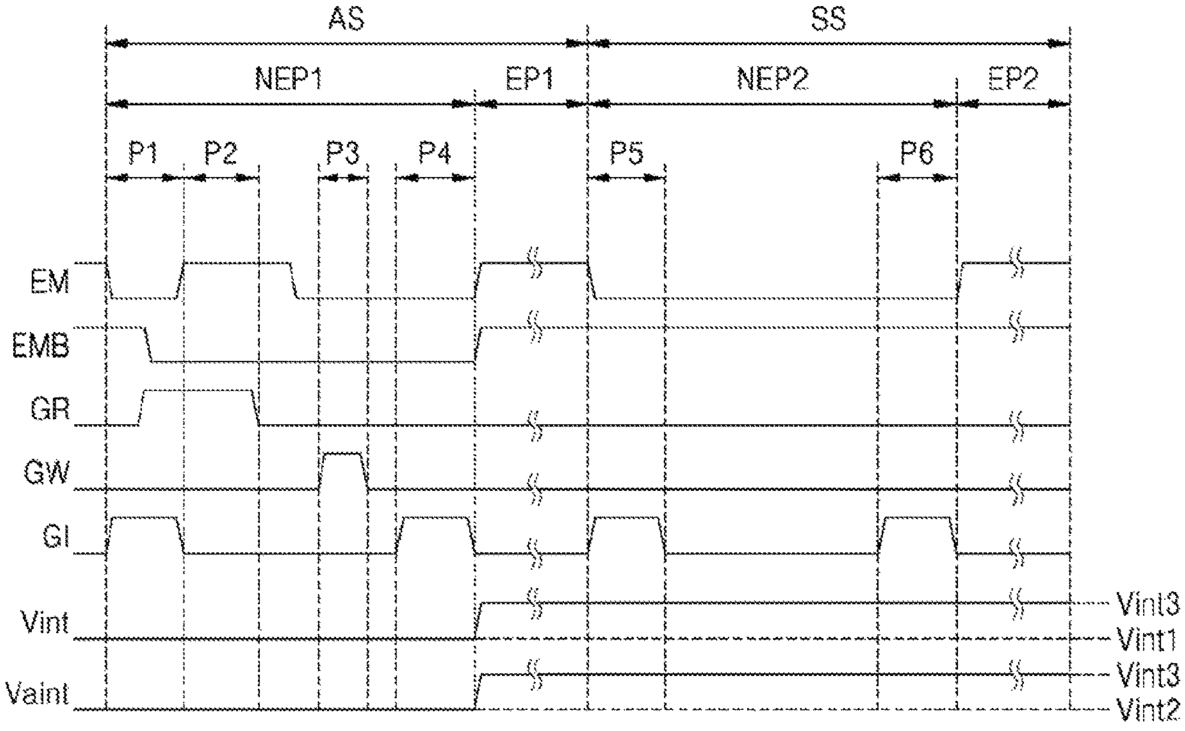
FIGS. 5 to 7 are schematic views showing signals for explaining an operation of the pixel shown in FIG. 4 according to an embodiment.
Figure 6:
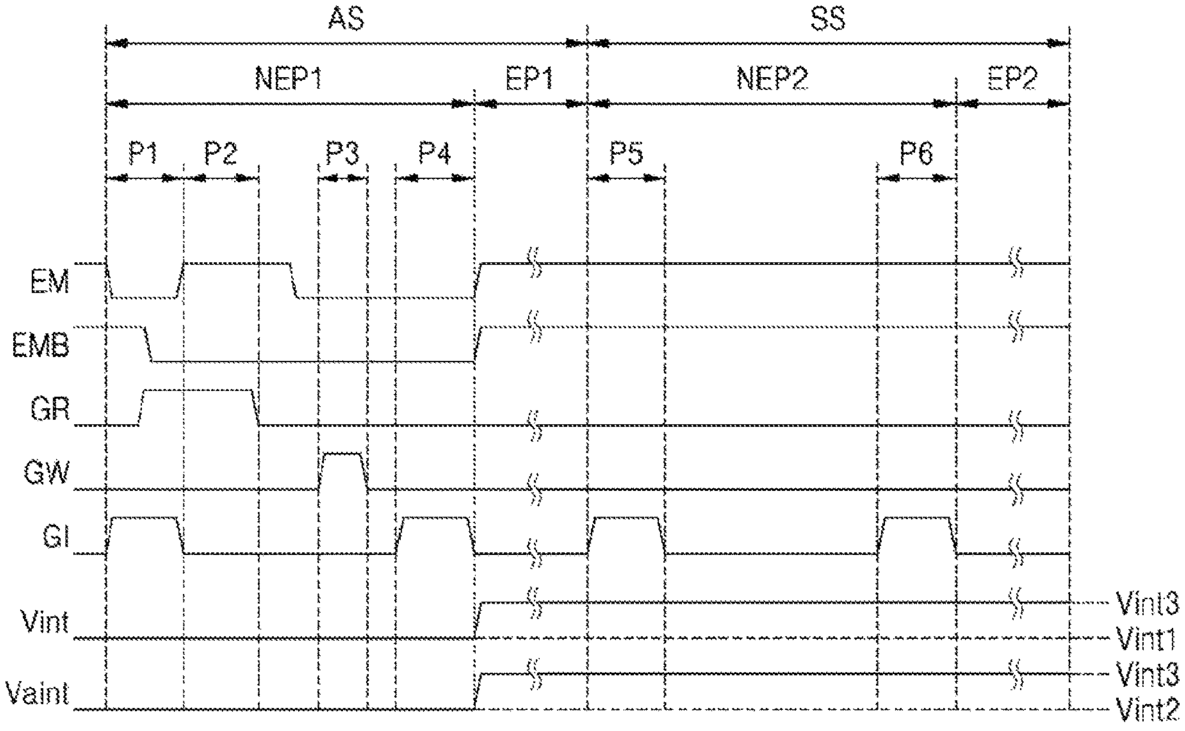
Figure 7:
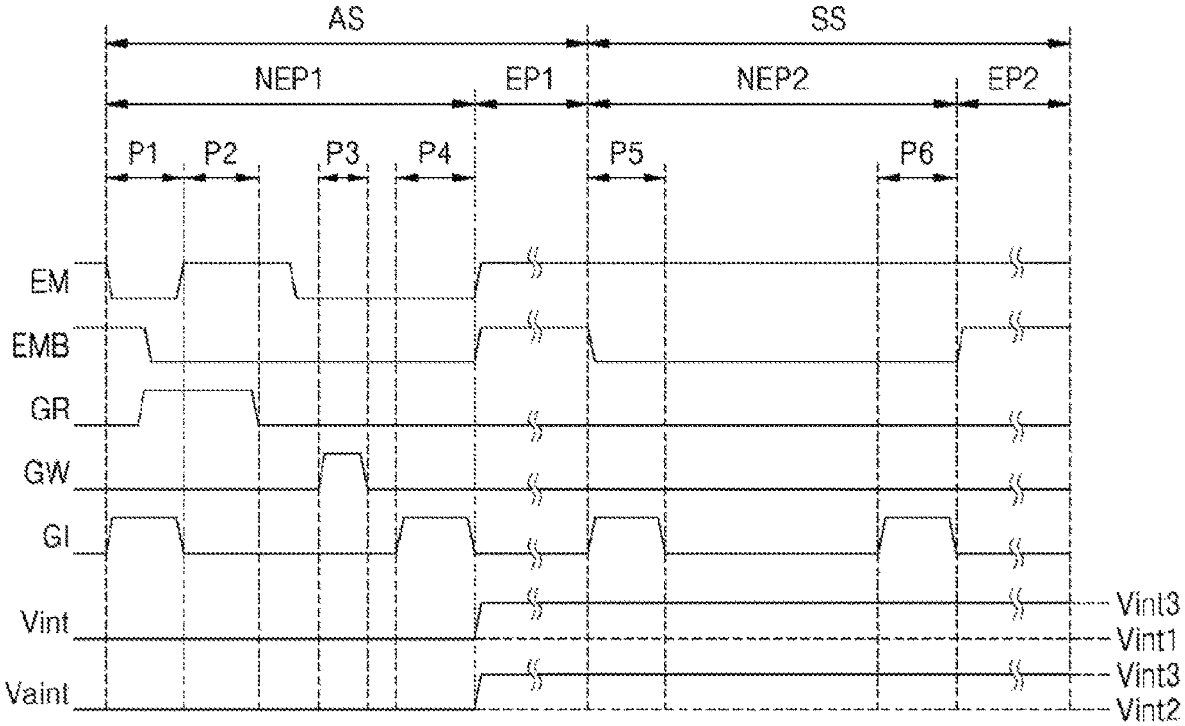

FIGS. 5 to 7 are schematic views showing signals for explaining an operation of the pixel shown in FIG. 4 according to an embodiment.

In an embodiment, a frame 1F may include a first scan period AS and at least one second scan period SS. FIGS. 5 to 7 show an example in which a frame 1F may include a first scan period AS and a second scan period SS.

A first gate signal GW, a second gate signal GI, a third gate signal GR, a fourth gate signal EM, and a fifth gate signal EMB may each have a high-level voltage (a first level voltage) for a partial period, and a low-level voltage (a second level voltage) for a partial period. Here, a high-level voltage may be an on-voltage of turning on a transistor, and a low-level voltage may be an off-voltage of turning off a transistor.

The first scan period AS may include a first non-emission period NEP1 in which a pixel PX does not emit light, and a first emission period EP1 in which a pixel PX emits light. The first non-emission period NEP1 may include a first period P1, a second period P2, a third period P3, and a fourth period P4.

The first period P1 may be a first initialization period (a reset period) in which the first node N1 electrically connected to the first gate of the first transistor T1, the second node N2 electrically connected to the first terminal of the sixth transistor T6, and the third node N3 electrically connected to the pixel electrode of the organic light-emitting diode OLED are initialized. During the first period P1, a second gate signal GI of an on-voltage may be supplied (applied) to the second gate line GIL. In a second half of the first period P1, a third gate signal GR of a gate-on voltage may be supplied to the third gate line GRL. During the first period P1, a first gate signal GW and a fourth gate signal EM may be supplied as gate-off voltages.

In the second half of the first period P1, the sixth transistor T6 may be turned off by a fifth gate signal EMB, the third transistor T3 may be turned on by a third gate signal GR, and the fourth transistor T4 and the seventh transistor T7 may be turned on by a second gate signal GI. The first node N1, the first gate of the first transistor T1 may be initialized to the reference voltage Vref by the third transistor T3 that is turned on. The second node N2 may be initialized to the first initialization voltage Vint by the sixth transistor T6 that is turned off and the fourth transistor T4 that is turned on. The third node N3 for example the pixel electrode of the organic light-emitting diode OLED may be initialized to the first initialization voltage Vint by the sixth transistor T6 that is turned off and the fourth transistor T4 that is turned on. Because the pixel electrode of the organic light-emitting diode OLED may be reset to the second initialization voltage Vaint during the first period P1, the first period P1 may be referred to as a reset period.

The second period P2 may be a compensation period in which the threshold voltage of the first transistor T1 may be compensated. During the second period P2, a third gate signal GR of a gate-on voltage may be supplied to the third gate line GRL, and a fourth gate signal EM of a gate-on voltage may be supplied to the fourth gate line EML. A first gate signal GW, a second gate signal GI, and a fifth gate signal EMB may be supplied as gate-off voltages.

The third transistor T3 may be turned on by a third gate signal GR, and the fifth transistor T5 may be turned on by a fourth gate signal EM. Accordingly, the reference voltage Vref may be supplied to the first node N1, and the first driving voltage ELVDD may be supplied to the first terminal of the first transistor T1, and thus, the first transistor T1 may be turned on. The voltage of the second terminal of the first transistor T1 may be lowered below a difference Vref-Vth between the reference voltage Vref and the threshold voltage Vth of the first transistor T1, and the first transistor T1 may be turned off. Since a voltage corresponding to the threshold voltage Vth of the first transistor T1 may be stored in the first capacitor C1, the threshold voltage Vth of the first transistor T1 may be compensated.

The third period P3 may be a write-period in which data signals are supplied to a pixel. During the third period P3, a first gate signal GW of a gate-on voltage may be supplied to the first gate line GWL. A second gate signal GI, a third gate signal GR, a fourth gate signal EM, and a fifth gate signal EMB may be supplied as gate-off voltages.

The second transistor T2 may be turned on by a first gate signal GW, and the second transistor T2 that is turned on may be configured to transfer a data signal Vdata from the data line DL to the first node N1 for example the first gate of the first transistor T1. Accordingly, the voltage of the first node N1 may be changed from the reference voltage Vref to a voltage corresponding to the data signal Vdata, and the voltage of the second node N2 may be changed in response to the amount of change in the voltage of the first node N1. The voltage of the second node N2 may become a voltage (Vref−Vth+α×(Vdata−Vref) (the symbol "×" representing a multiplication operation) that changes according to a capacitance ratio (α=C1/(C1+C2)) of the first capacitor C1 and the second capacitor C2. Accordingly, a voltage corresponding to the threshold voltage Vth of the first transistor T1 and the data signal Vdata may be stored in the first capacitor C1.

The fourth period P4 may be a second initialization period before the first emission period EP1 after data is written, in which the second node N2 electrically connected to the second terminal of the first transistor T1, and the third node N3 electrically connected to the pixel electrode of the organic light-emitting diode OLED are initialized. During the fourth period P4, a second gate signal GI of an on-voltage may be supplied to the second gate line GIL. A first gate signal GW, a third gate signal GR, a fourth gate signal EM, and a fifth gate signal EMB may be supplied as gate-off voltages.

The fourth transistor T4 may be turned on by a second gate signal GI, and the first initialization voltage Vint may be transferred to the second node N2 by the fourth transistor T4 that is turned on. The seventh transistor T7 may be turned on by a second gate signal GI, and the second initialization voltage Vaint may be transferred to the pixel electrode of the organic light-emitting diode OLED by the seventh transistor T7 that is turned on.

During the first scan period AS, the magnitude of the first initialization voltage Vint transferred to the second node N2 may be a first voltage Vint1. During the first scan period AS, the magnitude of the second initialization voltage Vaint transferred to the third node N3 and the pixel electrode of the organic light-emitting diode OLED may be a second voltage Vint2. During the first scan period AS, the magnitudes of the first initialization voltage Vint and the second initialization voltage Vaint respectively transferred to the first initialization voltage line VL1 and the second initialization voltage line VL2 may be different from each other. In other words, during the first scan period AS, the first voltage Vint1 of the first initialization voltage Vint and the second voltage Vint2 of the second initialization voltage Vaint may be different from each other.

The first emission period EP1 may be a period during which the organic light-emitting diode OLED emits light. During the first emission period EP1, a fourth gate signal EM of a gate-on voltage may be supplied to the fourth gate line EML, and a fifth gate signal EMB of a gate-on voltage may be supplied to the fifth gate line EMBL. A first gate signal GW, a second gate signal GI, and a third gate signal GR may be gate-off voltages.

During the first emission period EP1, the fifth transistor T5 may be turned on by a fourth gate signal EM, and the first driving voltage ELVDD may be supplied to the first terminal of the first transistor T1 by the fifth transistor T5. The first transistor T1 may be configured to output a driving current Id that may flow through the organic light-emitting diode OLED via the sixth transistor T6 that is turned on by a fifth gate signal EMB. The organic light-emitting diode OLED may be configured to emit light at a brightness corresponding to the magnitude of the driving current Id. The driving current Id may have a magnitude corresponding to a voltage corresponding to a data signal Vdata stored in the first capacitor C1, for example, the driving current Id may be proportional to a voltage (Vgs−Vth) obtained by subtracting the threshold voltage Vth of the first transistor T1 from a gate-source voltage Vgs of the first transistor T1, or "Id∝(Vgs−Vth)".

The second scan period SS may include a second non-emission period NEP2 in which a pixel PX does not emit light, and a second emission period EP2 in which a pixel PX emits light. The second non-emission period NEP2 may include a fifth period P5 and a sixth period P6. The fifth period P5 and the sixth period P6 may respectively correspond to the first period P1 and the fourth period P4 of the first scan period AS. An interval between the first period P1 and the fourth period P4 may be equal to an interval between the fifth period P5 and the sixth period P6. The second scan period SS may not include a compensation period corresponding to the second period P2 of the first scan period AS, and a write period corresponding to the third period P3.

The fifth period P5 may be a third initialization period (a reset period) in which the second node N2 electrically connected to the first terminal of the sixth transistor T6, and the third node N3 electrically connected to the pixel electrode of the organic light-emitting diode OLED are initialized. During the fifth period P5, a second gate signal GI of an on-voltage may be supplied to the second gate line GIL. During the fifth period P5, a first gate signal GW, a third gate signal GR, and a fourth gate signal EM may be supplied as gate-off voltages.

In a second half of the fifth period P5, the sixth transistor T6 may be turned off by a fifth gate signal EMB, and the fourth transistor T4 and the seventh transistor T7 may be turned on by a second gate signal GI. The second node N2 may be initialized to the first initialization voltage Vint by the sixth transistor T6 that is turned off and the fourth transistor T4 that is turned on. The third node N3, for example the pixel electrode of the organic light-emitting diode OLED may be initialized to the first initialization voltage Vint by the sixth transistor T6 that is turned off and the fourth transistor T4 that is turned on.

The sixth period P6 may be a fourth initialization period before the second emission period EP2, in which the second node N2 and the third node N3 electrically connected to the pixel electrode of the organic light-emitting diode OLED are initialized. The sixth period P6 may correspond to the fourth period P4 of the first scan period AS. During the sixth period P6, a second gate signal GI of an on-voltage may be supplied to the second gate line GIL. A first gate signal GW, a third gate signal GR, a fourth gate signal EM, and a fifth gate signal EMB may be supplied as gate-off voltages.

The seventh transistor T7 may be turned on by a second gate signal GI, and the first initialization voltage Vint may be transferred to the second node N2 by the seventh transistor T7 that is turned on. The fourth transistor T4 may be turned on by a second gate signal GI, and the second initialization voltage Vaint may be transferred to the third node N3 and the pixel electrode of the organic light-emitting diode OLED by the fourth transistor T4 that is turned on.

As shown in FIGS. 5 and 6, in an embodiment, during the second scan period SS, a fifth gate signal EMB may be supplied as a gate-on voltage. Because, during the second scan period SS, the gate driving circuit 13 supplies a fifth gate signal EMB as a constant gate-on voltage without change in a voltage level, power consumption may be reduced.

During the second scan period SS, in case that a fifth gate signal EMB is supplied as a gate-on voltage, and with the sixth transistor T6 turned on, in case that a second gate signal GI is supplied as a gate-on voltage and the fourth transistor T4 and the seventh transistor T7 are turned on, the first initialization voltage Vint and the second initialization voltage Vaint, which are different from each other, may be respectively transferred to the second node N2 and the third node N3, and a current may flow through the seventh transistor T7, the sixth transistor T6, and the fourth transistor T4.

As shown in FIGS. 5 and 6, in an embodiment, in order for the current not to flow through the seventh transistor T7, the sixth transistor T6, and the fourth transistor T4 while a fifth gate signal EMB is supplied as a gate-on voltage, and a second gate signal GI is supplied as a gate-on voltage, the magnitude of the first initialization voltage Vint supplied from the first initialization voltage line VL1 to the second node N2 and the magnitude of the second initialization voltage Vaint supplied from the second initialization voltage line VL2 to the third node N3 may be equal to a third voltage Vint3 during the second scan period SS. During the second scan period SS, the third voltage Vint3, which is the magnitude of the first initialization voltage Vint and the second initialization voltage Vaint transferred to the second node N2 and the third node N3 may be a value between the first voltage Vint1, which is the first initialization voltage Vint transferred to the second node N2 during the first scan period AS, and the second voltage Vint2, which is the second initialization voltage Vaint transferred to the third node N3 during the first scan period AS. For example, the value of the third voltage Vint3 between the first voltage Vint1 and the second voltage Vint2 may be any value between the first voltage Vint1 and the second voltage Vint2. In other examples, the value of the third voltage Vint3 between the first voltage Vint1 and the second voltage Vint2 may be an average value or a median value between the first voltage Vint1 and the second voltage Vint2.

The second emission period EP2 may be a period during which the organic light-emitting diode OLED emits light. The second emission period EP2 may correspond to the first emission period EP1 of the first scan period AS. During the second emission period EP2, a fourth gate signal EM of a gate-on voltage may be supplied to the fourth gate line EML, and a fifth gate signal EMB of a gate-on voltage may be supplied to the fifth gate line EMBL. A first gate signal GW, a second gate signal GI, and a third gate signal GR may be gate-off voltages.

During the second emission period EP2, the fifth transistor T5 may be turned on by a fourth gate signal EM, and the first driving voltage ELVDD may be supplied to the first terminal of the first transistor T1 by the fifth transistor T5. The first transistor T1 may be configured to output the driving current having a magnitude corresponding to the voltage stored in the first capacitor C1, for example the data signal Vdata, the driving current may flow through the organic light-emitting diode OLED through the sixth transistor T6 that may be turned on by a fifth gate signal EMB, and the organic light-emitting diode OLED may be configured to emit light at a brightness corresponding to the magnitude of the driving current. The data signal Vdata stored in the first capacitor C1 during the second emission period EP2 may be a signal, which may be a maintained data signal supplied to a pixel during the second period P3 of the first scan period AS.

Signals shown in FIG. 6 may be substantially equal or similar to signals shown in FIG. 5 except for a voltage level of a fourth gate signal EM.

Referring to FIG. 6, the gate driving circuit 13 may be configured to output a fourth gate signal EM of a gate-off voltage during the first period P1, the third period P3, and the fourth period P4 of the first scan period AS, and output a fourth gate signal EM of a gate-on voltage during the rest of the periods of the first scan period AS and the second scan period SS. The gate driving circuit 13 may be configured to output a fifth gate signal EMB of a gate-on voltage during the first emission period EP1 of the first scan period AS and the second scan period SS. During the second scan period SS, a fourth gate signal EM of a gate-on voltage may be supplied to the fourth gate line EML, and a fifth gate signal EMB of a gate-on voltage may be supplied to the fifth gate line EMBL.

During the fifth period P5 and the sixth period P6, a second gate signal GI of a gate-on voltage may be supplied to the second gate line GIL, a fourth gate signal EM of a gate-on voltage may be supplied to the fourth gate line EML, and a fifth gate signal EMB of a gate-on voltage may be supplied to the fifth gate line EMBL. A first gate signal GW and a third gate signal GR may be supplied as gate-off voltages. The fifth transistor T5 may be turned on by a fourth gate signal EM, the sixth transistor T6 may be turned on by a fifth gate signal EMB, and the fourth transistor T4 and the seventh transistor T7 may be turned on by a second gate signal GI. The second node N2 and the third node N3 may be respectively initialized to the first initialization voltage Vint and the second initialization voltage Vaint having the third voltage Vint3 of the same magnitude by the fourth transistor T4 and the seventh transistor T7 that are turned on.

In the display apparatus according to the embodiment shown in FIG. 6, because the gate driving circuit 13 may be configured to supply a fourth gate signal EM and a fifth gate signal EMB as constant gate-on voltages without a change in a voltage level during the second scan period SS, power consumption may be reduced.

Signals shown in FIG. 7 may be substantially equal or similar to signals shown in FIG. 6 except for a voltage level of a fifth gate signal EMB.

Referring to FIG. 7, the gate driving circuit 13 may be configured to output a fourth gate signal EM of a gate-off voltage during the first period P1, the third period P3, and the fourth period P4 of the first scan period AS, and output a fourth gate signal EM of a gate-on voltage during the rest of the periods of the first scan period AS and the second scan period SS. The gate driving circuit 13 may be configured to output a fifth gate signal EMB of a gate-on voltage during the first emission period EP1 of the first scan period AS and the second emission period EP2 of the second scan period SS. During the second scan period SS, a fourth gate signal EM of an on-voltage may be supplied to the fourth gate line EML. During the second emission period EP2 of the second scan period SS, a fifth gate signal EMB of a gate-on voltage may be supplied to the fifth gate line EMBL.

Because, during the second scan period SS, the gate driving circuit 13 supplies a fourth gate signal EM as a constant gate-on voltage without change in a voltage level, power consumption may be reduced.

As shown in FIG. 7, in case that a fourth gate signal EM of a gate-on voltage is supplied to the fourth gate line EML during the second scan period SS, and as shown in FIG. 5, in case that a fourth gate signal EM of a gate-on voltage is supplied only in the second emission period EP2 during the second scan period SS, operation points at which the organic light-emitting diode OLED may be different from each other. In other words, in case that a fourth gate signal EM of a gate-on voltage is supplied to the fourth gate line EML during the second scan period SS, and in case that a fourth gate signal EM of a gate-on voltage is supplied only in the second emission period EP2 during the second scan period SS, voltages of the second node N2, the third node N3, and the pixel electrode of the organic light-emitting diode OLED may be different from each other, and thus, light emitted during the first scan period AS may be different from light emitted during the second scan period SS.

In an embodiment, in case that a fourth gate signal EM of a gate-on voltage is supplied to the fourth gate line EML during the second scan period SS, for the same light as light of the first scan period AS to be emitted during the second scan period SS, the magnitudes of the first initialization voltage Vint and the second initialization voltage Vaint respectively transferred to the second node N2 and the third node N3 during the fifth period P5 and the sixth period P6 may be equal to the third voltage Vint3. During the second scan period SS, the third voltage Vint3, which is the magnitude of the first initialization voltage Vint and the second initialization voltage Vaint transferred to the second node N2 and the third node N3 may be a value between the first voltage Vint1, which is the first initialization voltage Vint transferred to the second node N2 during the first scan period AS, and the second voltage Vint2, which is the second initialization voltage Vaint transferred to the third node N3 during the first scan period AS.

Figure 8:
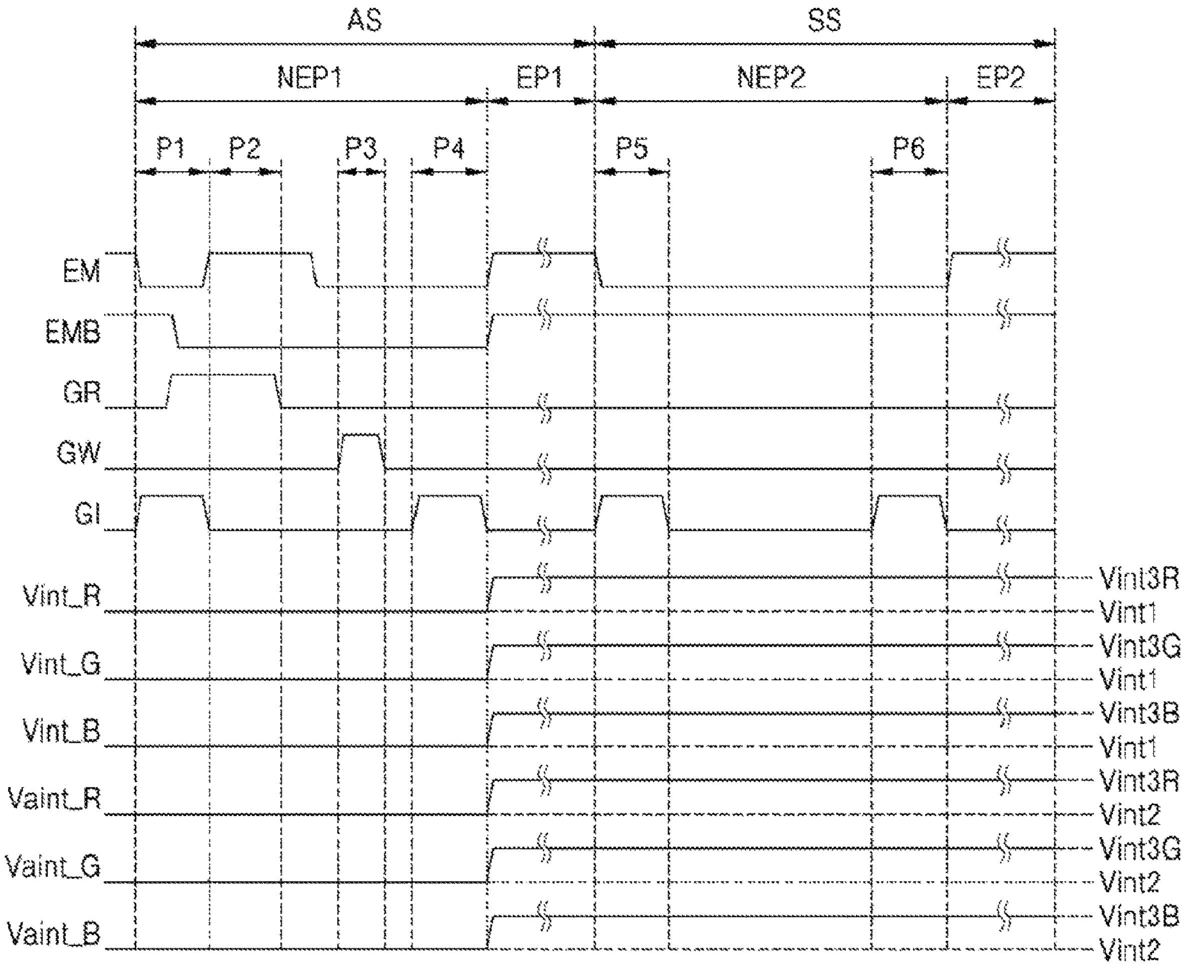
FIGS. 8 to 10 are schematic views showing signals for explaining an operation of the pixel shown in FIG. 4 according to an embodiment.
Figure 9:
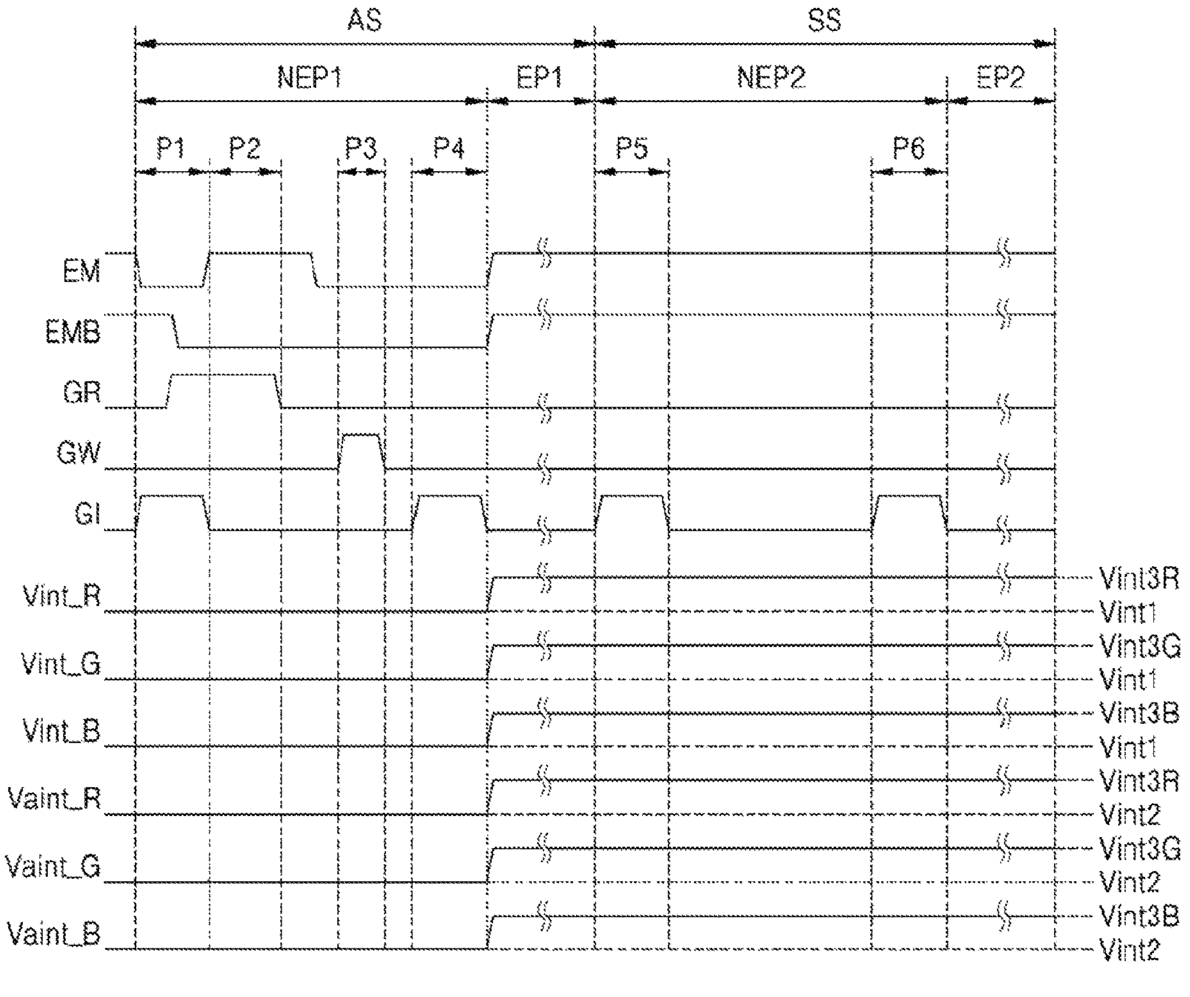
Figure 10:
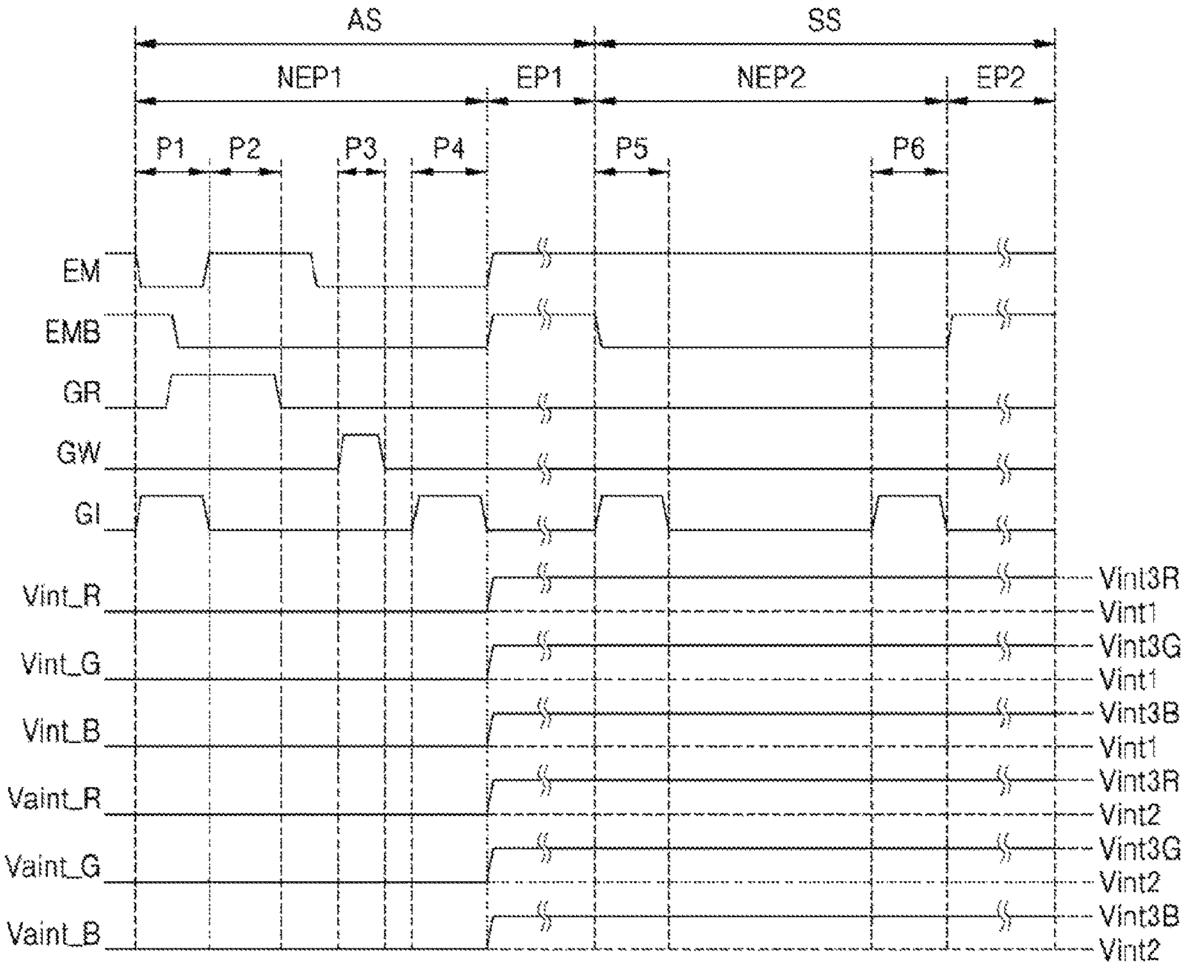

FIGS. 8 to 10 are schematic views showing signals for explaining an operation of the pixel shown in FIG. 4 according to an embodiment.

In FIGS. 8 to 10, same reference numerals are used for the periods and signals described with reference to FIGS. 5 to 7, and thus, repeated descriptions thereof are omitted.

Signals shown in FIG. 8 exclude the first initialization voltage and the second initialization voltage for each pixel, and may be substantially equal or similar to the signals shown in FIG. 7.

The pixels PX arranged in the display area DA may include a first pixel PX1 configured to emit light of a first color, a second pixel PX2 configured to emit light of a second color, and a third pixel PX3 configured to emit light of a third color. As an example, the first pixel PX1 may be a red pixel, the second pixel PX2 may be a green pixel, and the third pixel PX3 may be a blue pixel. The first pixel PX1, the second pixel PX2, and the third pixel PX3 may be repeatedly arranged according a preset pattern in the x direction and the y direction. The first pixel PX1, the second pixel PX2, and the third pixel PX3 may each include the pixel circuit PC shown in FIG. 4 and the organic light-emitting diode OLED as a display element electrically connected to the pixel circuit PC.

In an embodiment, different first initialization voltages Vint may be respectively supplied to the first pixel PX1, the second pixel PX2, and the third pixel PX3 by taking into account light-emitting characteristics of the first pixel PX1, the second pixel PX2, and the third pixel PX3. As an example, the pixel circuit PC of the first pixel PX1 may be electrically connected to a first-first (1-1)st initialization voltage line, the pixel circuit PC of the second pixel PX2 may be electrically connected to a first-second (1-2)nd initialization voltage line, and the pixel circuit PC of the third pixel PX3 may be electrically connected to a first-third (1-3)rd initialization voltage line. As shown in FIG. 10, from a start point of the first emission period EP1 of the first scan period AS, a first-first (1-1)st initialization voltage Vint3R may be supplied to the first-first (1-1)st initialization voltage line, a first-second (1-2)nd initialization voltage Vint3G may be supplied to the first-second (1-2)nd initialization voltage line, and a first-third (1-3)rd initialization voltage Vint3B may be supplied to the first-third (1-3)rd initialization voltage line.

In an embodiment, different second initialization voltages Vaint may be respectively supplied to the first pixel PX1, the second pixel PX2, and the third pixel PX3 by taking into account light-emitting characteristics of the first pixel PX1, the second pixel PX2, and the third pixel PX3. As an example, the pixel circuit PC of the first pixel PX1 may be electrically connected to a second-first (2-1)st initialization voltage line, the pixel circuit PC of the second pixel PX2 may be electrically connected to a second-second (2-2)nd initialization voltage line, and the pixel circuit PC of the third pixel PX3 may be electrically connected to a second-third (2-3)rd initialization voltage line. As shown in FIG. 8, from a start point of the first emission period EP1 of the first scan period AS, a second-first (2-1)st initialization voltage Vint3R may be supplied to the second-first (2-1)st initialization voltage line, a second-second (2-2)nd initialization voltage Vint3G may be supplied to the second-second (2-2)nd initialization voltage line, and a second-third (2-3)rd initialization voltage Vint3B may be supplied to the second-third (2-3)rd initialization voltage line.

As described in FIG. 5, during the second scan period SS, the magnitudes of the first-first (1-1)st initialization voltage Vint_R=Vint3R and the second-first (2-1)st initialization voltage Vaint_R=Vint3R supplied to the pixel circuit PC of the first pixel PX1 may be equal to each other. The magnitudes of the first-first (1-1)st initialization voltage Vint_R=Vint3R and the second-first (2-1)st initialization voltage Vaint_R=Vint3R may be a value between the magnitude of the first initialization voltage Vint1 and the magnitude of the second initialization voltage Vint2 supplied to the pixel circuit PC of the first pixel PX1 during the first scan period AS. The magnitudes of the first-second (1-2)nd initialization voltage Vint_G=Vint3G and the second-second (2-2)nd initialization voltage Vaint_G=Vint3G supplied to the pixel circuit PC of the second pixel PX2 may be equal to each other. The magnitudes of the first-second (1-2)nd initialization voltage Vint_G=Vint3G and the second-second (2-2)nd initialization voltage Vaint_G=Vint3G may be a value between the magnitude of the first initialization voltage Vint1 and the magnitude of the second initialization voltage Vint2 supplied to the pixel circuit PC of the second pixel PX2 during the first scan period AS. The magnitudes of the first-third (1-3)rd initialization voltage Vint_B=Vint3B and the second-third (2-3)rd initialization voltage Vaint_B=Vint3B supplied to the pixel circuit PC of the third pixel PX3 may be equal to each other. The magnitudes of the first-third (1-3)rd initialization voltage Vint_B=Vint3B and the second-third (2-3)rd initialization voltage Vaint_B=Vint3B may be a value between the magnitude of the first initialization voltage Vint1 and the magnitude of the second initialization voltage Vint2 supplied to the pixel circuit PC of the third pixel PX3 during the first scan period AS.

Signals shown in FIG. 9 may be substantially equal or similar to signals shown in FIG. 10 except for a voltage level of a fourth gate signal EM. Referring to FIG. 9, the gate driving circuit 13 may be configured to output a fourth gate signal EM of a gate-off voltage during the first period P1, the third period P3, and the fourth period P4 of the first scan period AS, and output a fourth gate signal EM of a gate-on voltage during the rest of the periods of the first scan period AS and the second scan period SS.

Signals shown in FIG. 10 may be substantially equal or similar to signals shown in FIG. 9 except for a voltage level of a fifth gate signal EMB. Referring to FIG. 10, the gate driving circuit 13 may be configured to output a fifth gate signal EMB of a gate-on voltage during the first emission period EP1 of the first scan period AS and the second emission period EP2 of the second scan period SS.

Figure 11A:
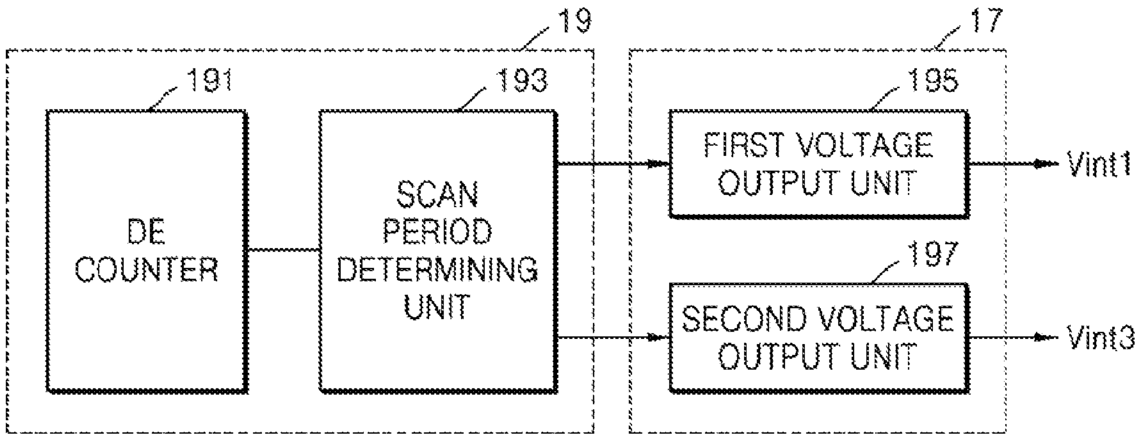
FIGS. 11A and 11B are schematic views for explaining an output of an initialization voltage according to an embodiment.
Figure 11B:
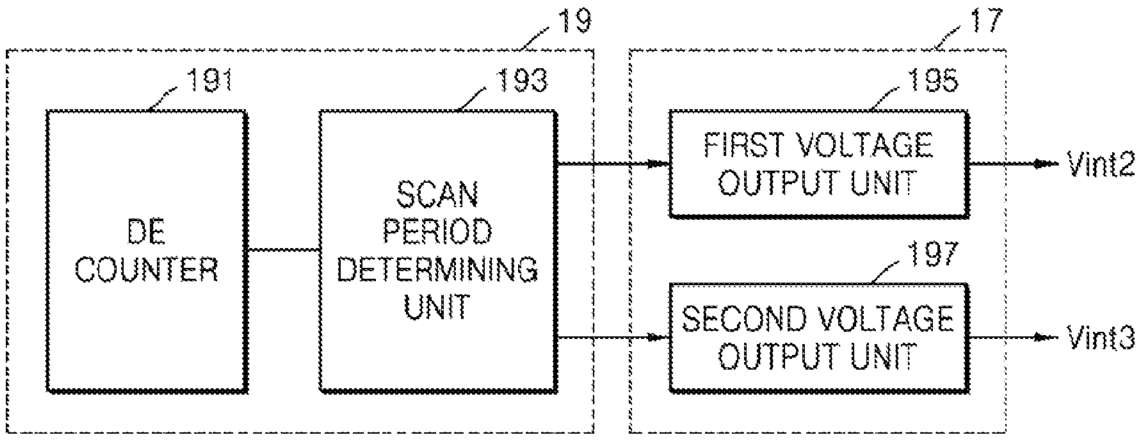

FIGS. 11A and 11B are schematic views for explaining an output of an initialization voltage according to an embodiment. Specifically, FIG. 11A schematically shows an output of the first initialization voltage, and FIG. 11B schematically shows an output of the second initialization voltage.

Referring to FIG. 11A, the display apparatus 1 may include a DE counter 191, a scan period determining part 193, a first voltage output part 195, and a second voltage output part 197.

The DE counter 191 may be configured to count a data enable signal DE that may be output to the data driving circuit 15 by the controller 19. During the third period P3 of every frame, from a first row (a pixel line) to a last row, first gate signals GW may be sequentially applied to the first gate lines GWL, and data signals Vdata may be supplied to the pixels PX in response to a data enable signal DE.

The scan period determining part 193 may be configured to determine the first scan period AS and the second scan period SS based on a count value of the DE counter 191. The scan period determining part 193 may be configured to output a control signal including information about a change time of the initialization voltage based on a frame frequency of the display apparatus and a count value of a data enable signal DE. In an embodiment, a control signal PCS output by the controller 19 may include information about a change time of the initialization voltage. The change point of the initialization voltage may be set to an arbitrary point in time between the fourth period P4 of the first scan period AS and the start point of the second scan period SS. As an example, the change point of the initialization voltage may be a start point of the second scan period SS or a start point of the fifth period P5. As another example, the change time of the initialization voltage may be before the start point of the second scan period SS or before the start point of the fifth period P5. As an example, the change point of the initialization voltage may be a start point of the first emission period EP1 of the first scan period AS.

The first voltage output part 195 may be configured to output the first initialization voltage Vint having a magnitude of the first voltage Vint1, and the second voltage output part 197 may be configured to output the first initialization voltage Vint having a magnitude of the third voltage Vint3 according to a control signal of the scan period determining part 193. In an embodiment, the first voltage output part 195 and the second voltage output part 197 may be separately implemented as different integrated circuits, or implemented together in the same integrated circuit.

In an embodiment shown in FIGS. 11A and 11B, the DE counter 191 and the scan period determining part 193 may be included in the controller 19, and the first voltage output part 195 and the second voltage output part 197 may be included in the power supply circuit 17. In an embodiment, the DE counter 191 and the scan period determining part 193 may be included in the power supply circuit 17.

Referring to FIG. 11B, the first voltage output part 195 may be configured to output the second initialization voltage Vaint having a magnitude of the second voltage Vint2, and the second voltage output part 197 may be configured to output the second initialization voltage Vaint having a magnitude of the third voltage Vint3 according to a control signal of the scan period determining part 193. In an embodiment, the first voltage output part 195 and the second voltage output part 197 may be separately implemented as different integrated circuits, or implemented together in the same integrated circuit.

Figure 12:
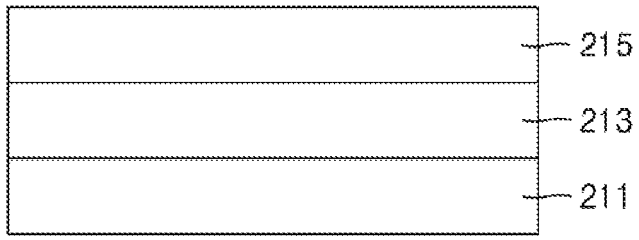
FIG. 12 is a schematic cross-sectional view of a structure of a display element according to an embodiment.

FIG. 12 is a schematic cross-sectional view of a structure of a display element according to an embodiment. FIGS. 13A to 15 are schematic cross-sectional views of a structure of a display element according to an embodiment.

Referring to FIG. 12, the organic light-emitting diode OLED, which is a display element according to an embodiment, may include a pixel electrode 211, an opposite electrode 215, and a layer 213 between the pixel electrode 211 (a first electrode, e.g., an anode) and the opposite electrode 215 (a second electrode, e.g., a cathode).

The pixel electrode 211 may include a light-transmissive conductive oxide such as indium tin oxide (ITO), indium zinc oxide (IZO), zinc oxide (ZnO), indium oxide ($In_2O_3$), indium gallium oxide (IGO), or aluminum zinc oxide (AZO), or a combination thereof. The pixel electrode 211 may include a reflective layer including silver (Ag), magnesium (Mg), aluminum (Al), platinum (Pt), palladium (Pd), gold (Au), nickel (Ni), neodymium (Nd), iridium (Ir), chrome (Cr), or a compound thereof, or a combination thereof. As an example, the pixel electrode 211 may have a three-layered structure of ITO/Ag/ITO.

The opposite electrode 215 may be disposed on the layer 213. The opposite electrode 215 may include a metal, alloy, electrically conductive compound, or any combination thereof having a low work function. As an example, the opposite electrode 215 may include lithium (Li), silver (Ag), magnesium (Mg), aluminum (Al), aluminum-lithium (Al—Li), calcium (Ca), magnesium-indium (Mg—In), magnesium-silver (Mg—Ag), ytterbium (Yb), silver-ytterbium (Ag—Yb), ITO, IZO, or any combination thereof. The opposite electrode 215 may be a transmissive electrode, a semi-transmissive electrode, or a reflective electrode.

The layer 213 may include a polymer organic material or a low-molecular weight organic material emitting light having a preset color. In addition to various organic materials, the layer 213 may further include metal-containing compounds such as organometallic compounds, inorganic materials such as quantum dots, and the like, or a combination thereof.

In an embodiment, the layer 213 may include an emission layer and a first functional layer and a second functional layer respectively under and on the emission layer. The first functional layer may include, for example, a hole transport layer (HTL), or include an HTL and a hole injection layer (HIL). The second functional layer may include an electron transport layer (ETL) and/or an electron injection layer (EIL). The first functional layer or the second functional layer may be omitted. The first functional layer and the second functional layer may be integrally formed with each other to correspond to the organic light-emitting diodes OLED included in the display area DA.

In an embodiment, the layer 213 may include two or more emitting units and a charge generation layer CGL disposed between the two emitting units, wherein the two or more emitting units are sequentially stacked each other between the pixel electrode 211 and the opposite electrode 215. In case that the layer 213 includes the emitting part and the charge generation layer, the organic light-emitting diode OLED may be a tandem light-emitting element. The organic light-emitting diode OLED may be configured to improve color purity and a light emission efficiency by having a stack structure of emitting units.

An emitting part may include the emission layer and the first functional layer and the second functional layer respectively under and on the emission layer. The charge generation layer CGL may include a negative charge generation layer and a positive charge generation layer. A light-emission efficiency of the organic light-emitting diode OLED, which may be a tandem light-emitting element including emission layers, may be enhanced even more by the negative charge generation layer and the positive charge generation layer.

The negative charge generation layer may be an n-type charge generation layer. The negative charge generation layer may be configured to supply electrons. The negative charge generation layer may include a host and a dopant. The host may include an organic material. The dopant may include a metal material. The positive charge generation layer may be a p-type charge generation layer. The positive charge generation layer may be configured to supply holes. The positive charge generation layer may include a host and a dopant. The host may include an organic material. The dopant may include a metal material.

Figure 13A:
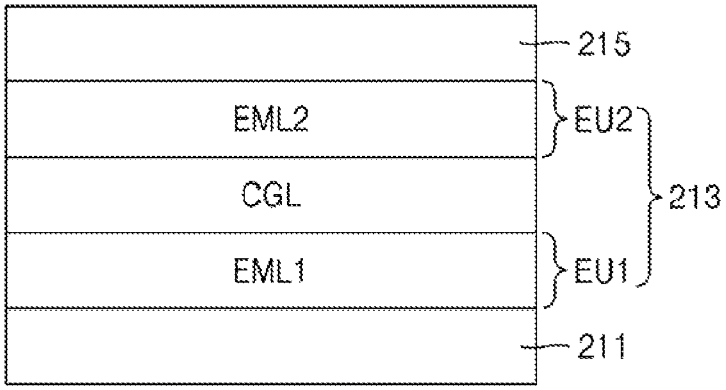
FIGS. 13A-13D, 14A-14B to 15 are schematic cross-sectional views of a structure of a display element according to an embodiment.

In an embodiment, as shown in FIG. 13A, the organic light-emitting diode OLED may include a first emitting part EU1 and a second emitting part EU2 that may be sequentially stacked each other, wherein the first emitting part EU1 may include a first emission layer EML1, and the second emitting part EU2 may include a second emission layer EML2. The charge generation layer CGL may be disposed between the first emitting part EU1 and the second emitting part EU2. As an example, the organic light-emitting diode OLED may include the pixel electrode 211, the first emission layer EML1, the charge generation layer CGL, the second emission layer EML2, and the opposite electrode 215 that may be sequentially stacked each other. The first functional layer and the second functional layer may be disposed under and on the first emission layer EML1. The first functional layer and the second functional layer may be disposed under and on the second emission layer EML2. The first emission layer EML1 may be a blue emission layer, and the second emission layer EML2 may be a yellow emission layer.

Figure 13B:
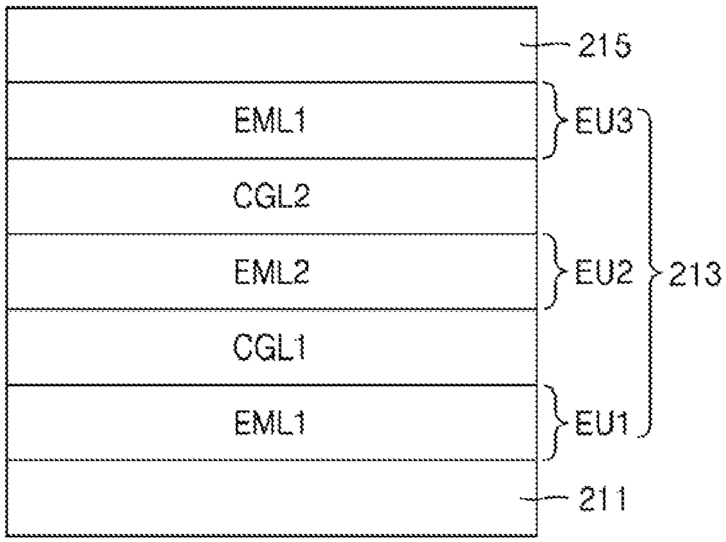

In an embodiment, as shown in FIG. 13B, the organic light-emitting diode OLED may include a first emitting part EU1, a second emitting part EU2, and a third emitting part EU3 that may be sequentially stacked each other, wherein the first emitting part EU1 may include the first emission layer EML1, and the second emitting part EU2 may include the second emission layer EML2. A first charge generation layer CGL1 may be disposed between the first emitting part EU1 and the second emitting part EU2, and a second charge generation layer CGL2 may be disposed between the second emitting part EU2 and the third emitting part EU3. As an example, the organic light-emitting diode OLED may include the pixel electrode 211, the first emission layer EML1, the first charge generation layer CGL1, the second emission layer EML2, the second charge generation layer CGL2, the first emission layer EML1, and the opposite electrode 215 that may be sequentially stacked each other. The first functional layer and the second functional layer may be disposed under and on the first emission layer EML1. The first functional layer and the second functional layer may be disposed under and on the second emission layer EML2. The first emission layer EML1 may be a blue emission layer, and the second emission layer EML2 may be a yellow emission layer.

In an embodiment, in the organic light-emitting diode OLED, the second emitting part EU2 may further include a third emission layer EML3 and/or a fourth emission layer EML4 that may be in direct contact with the second emission layer EML2 under and/or on the second emission layer EML2 in addition to the second emission layer EML2. Here, direct contact may mean that another layer is not disposed between the second emission layer EML2 and the third emission layer EML3 and/or the second emission layer EML2 and the fourth emission layer EML4. The third emission layer EML3 may be a red emission layer, and the fourth emission layer EML4 may be a green emission layer.

Figure 13C:
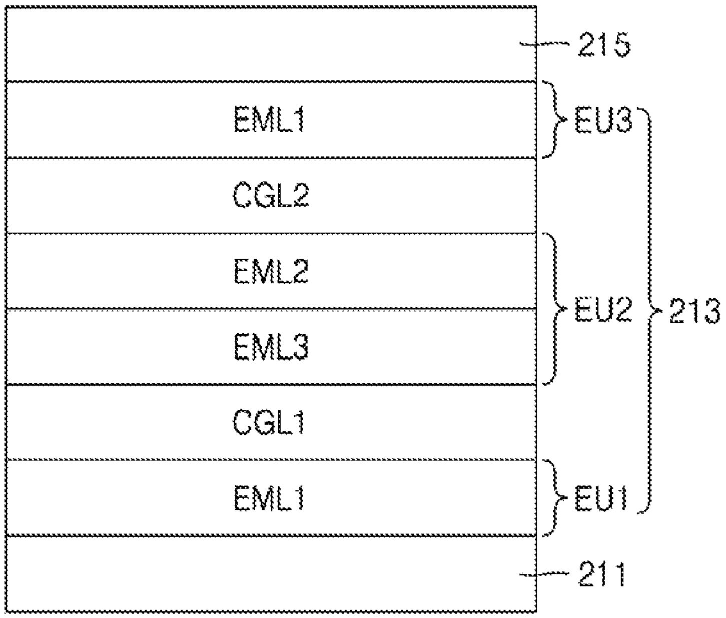
Figure 13D:
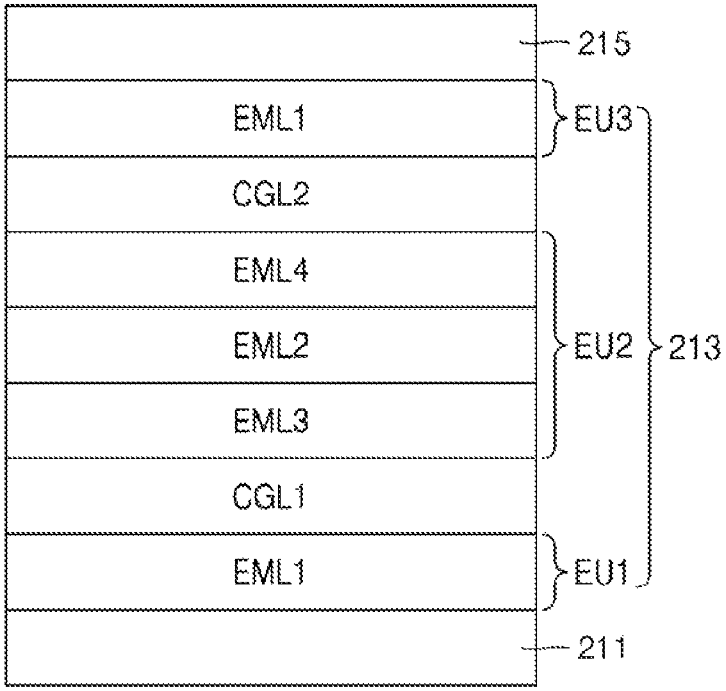

As an example, as shown in FIG. 13C, the organic light-emitting diode OLED may include the pixel electrode 211, the first emission layer EML1, the first charge generation layer CGL1, the third emission layer EML3, the second emission layer EML2, the second charge generation layer CGL2, the first emission layer EML1, and the opposite electrode 215 that may be sequentially stacked each other. As another example, as shown in FIG. 13D, the organic light-emitting diode OLED may include the pixel electrode 211, the first emission layer EML1, the first charge generation layer CGL1, the third emission layer EML3, the second emission layer EML2, the fourth emission layer EML4, the second charge generation layer CGL2, the first emission layer EML1, and the opposite electrode 215 that may be sequentially stacked each other.

Figure 14A:
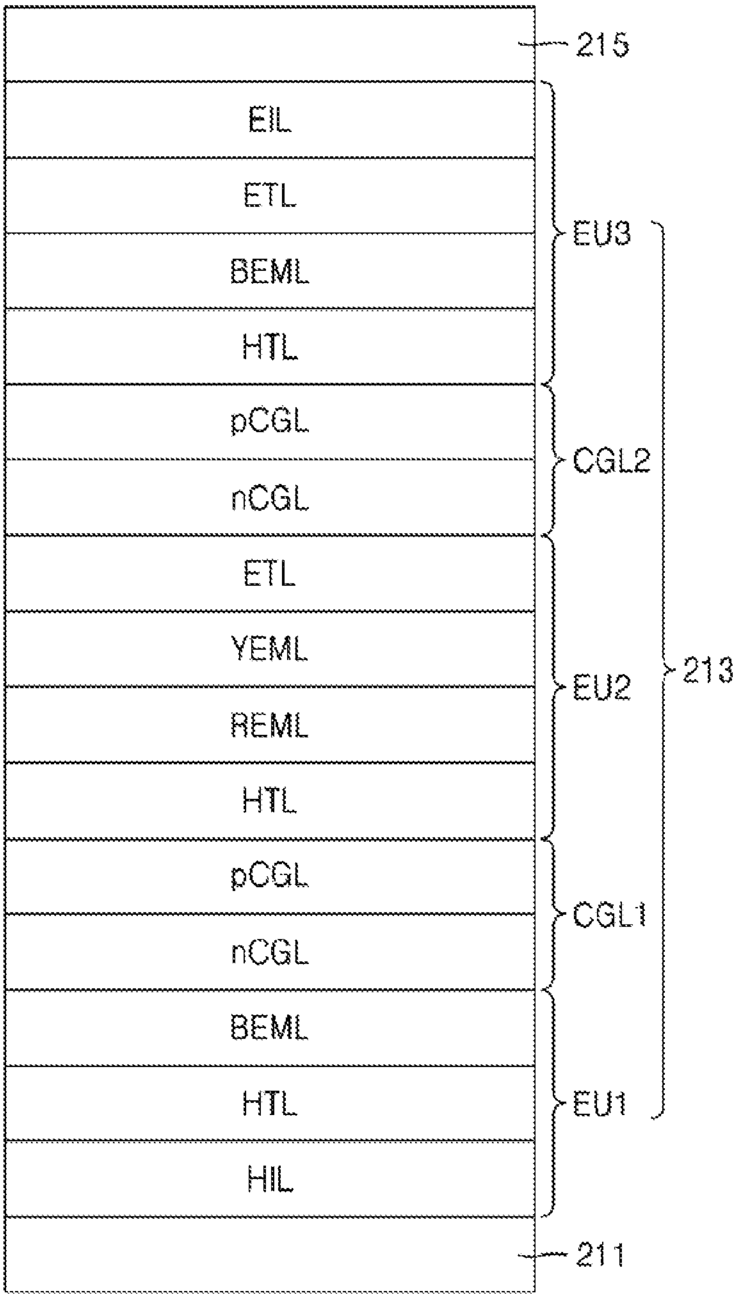
Figure 14B:
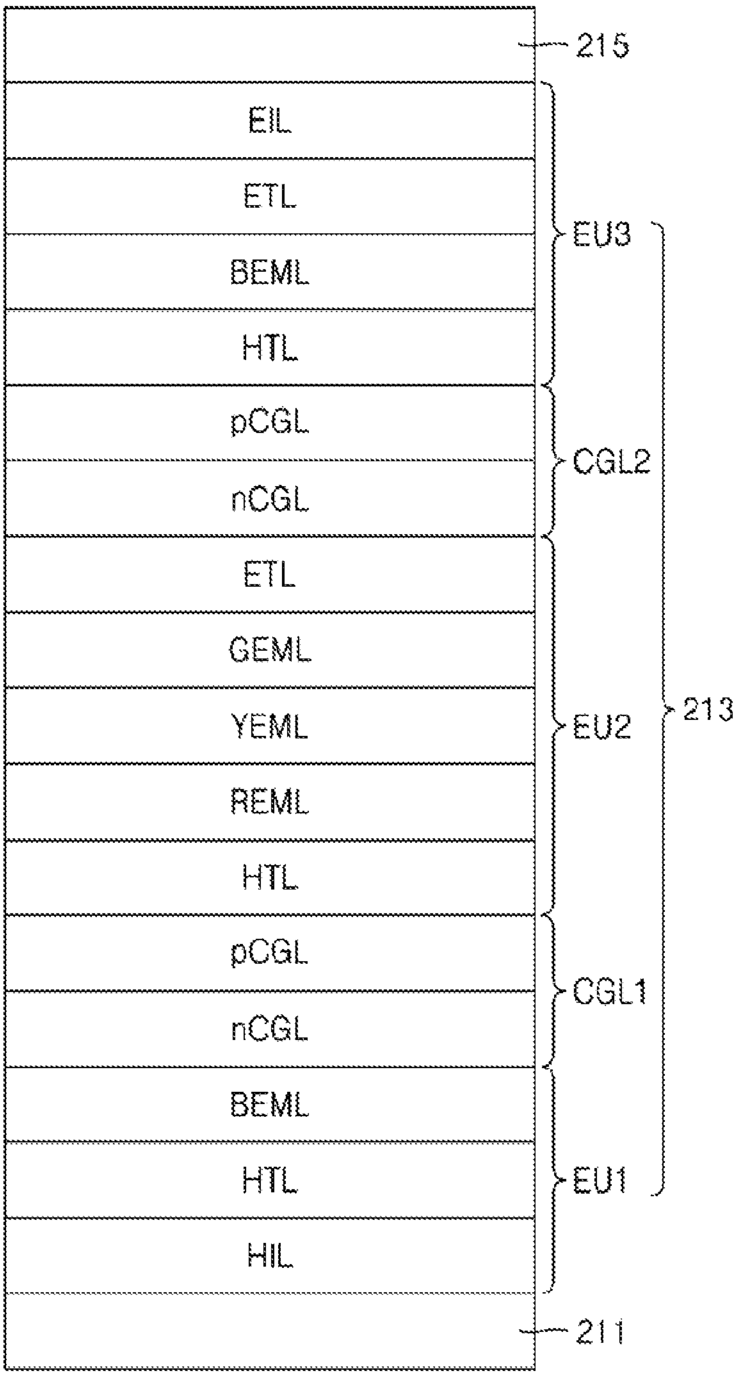

FIG. 14A is a schematic cross-sectional view showing an example of the organic light-emitting diode of FIG. 16C, and FIG. 14B is a schematic cross-sectional view showing an example of the organic light-emitting diode of FIG. 16D.

Referring to FIG. 20A, the organic light-emitting diode OLED may include the first emitting part EU1, the second emitting part EU2, and the third emitting part EU3 that may be sequentially stacked each other. A first charge generation layer CGL1 may be disposed between the first emitting part EU1 and the second emitting part EU2, and a second charge generation layer CGL2 may be disposed between the second emitting part EU2 and the third emitting part EU3. The first charge generation layer CGL1 and the second charge generation layer CGL2 may respectively include a negative charge generation layer nCGL and a positive charge generation layer pCGL.

The first emitting part EU1 may include a blue emission layer BEML. The first emitting part EU1 may further include a hole injection layer HIL and a hole transport layer HTL between the pixel electrode 211 and the blue emission layer BEML. In an embodiment, a p-doped layer may be further disposed between the hole injection layer HIL and the hole transport layer HTL. A p-doped layer may be formed by doping the hole injection layer HIL with p-type dopants. In an embodiment, at least one of a blue light auxiliary layer, an electron blocking layer, and a buffer layer may be further disposed between the blue emission layer BEML and the hole transport layer HTL. The blue light auxiliary layer may be configured to enhance a light emission efficiency of the blue emission layer BEML. The blue light auxiliary layer may be configured to enhance a light emission efficiency of the blue emission layer BEML by adjusting a hole charge balance. The electron blocking layer may prevent injection of electrons into the hole transport layer (HTL). The buffer layer may be configured to compensate for a resonance distance depending on the wavelength of light emitted from the emission layer.

The second emitting part EU2 may include a yellow emission layer YEML and a red emission layer REML under the yellow emission layer YEML that is in direct contact with the yellow emission layer YEML. The second emitting part EU2 may further include a hole transport layer HTL between the red emission layer REML and the positive charge generation layer pCGL of the first charge generation layer CGL1, and further include an electron transport layer ETL between the yellow emission layer YEML and a negative charge generation layer nCGL of the second charge generation layer CGL2.

The third emitting part EU3 may include a blue emission layer BEML. The third emitting part EU3 may further include a hole transport layer HTL between the blue emission layer BEML and the positive charge generation layer pCGL of the second charge generation layer CGL2. The third emitting part EU3 may further include an electron transport layer ETL and an electron injection layer EIL between the blue emission layer BEML and the opposite electrode 215. The electron transport layer ETL may include a single layer or a multi-layer. In an embodiment, at least one of a blue light auxiliary layer, an electron blocking layer, and a buffer layer may be further disposed between the blue emission layer BEML and the hole transport layer HTL. At least one of a hole blocking layer and a buffer layer may be further disposed between the blue emission layer BEML and the electron transport layer ETL. The hole blocking layer may prevent injection of holes into the electron transport layer (ETL).

The organic light-emitting diode OLED shown in FIG. 14B is different from the organic light-emitting diode OLED shown in FIG. 14A in the stack structure of the second emitting part EU2, and other constructions may be the same. Referring to FIG. 14B, the second emitting part EU2 may include the yellow emission layer YEML, the red emission layer REML under the yellow emission layer YEML and being in direct contact with the yellow emission layer YEML, and the green emission layer GEML on the yellow emission layer YEML and being in direct contact with the yellow emission layer YEML. The second emitting part EU2 may further include a hole transport layer HTL between the red emission layer REML and the positive charge generation layer pCGL of the first charge generation layer CGL1, and further include an electron transport layer ETL between the green emission layer GEML and a negative charge generation layer nCGL of the second charge generation layer CGL2.

Figure 15:
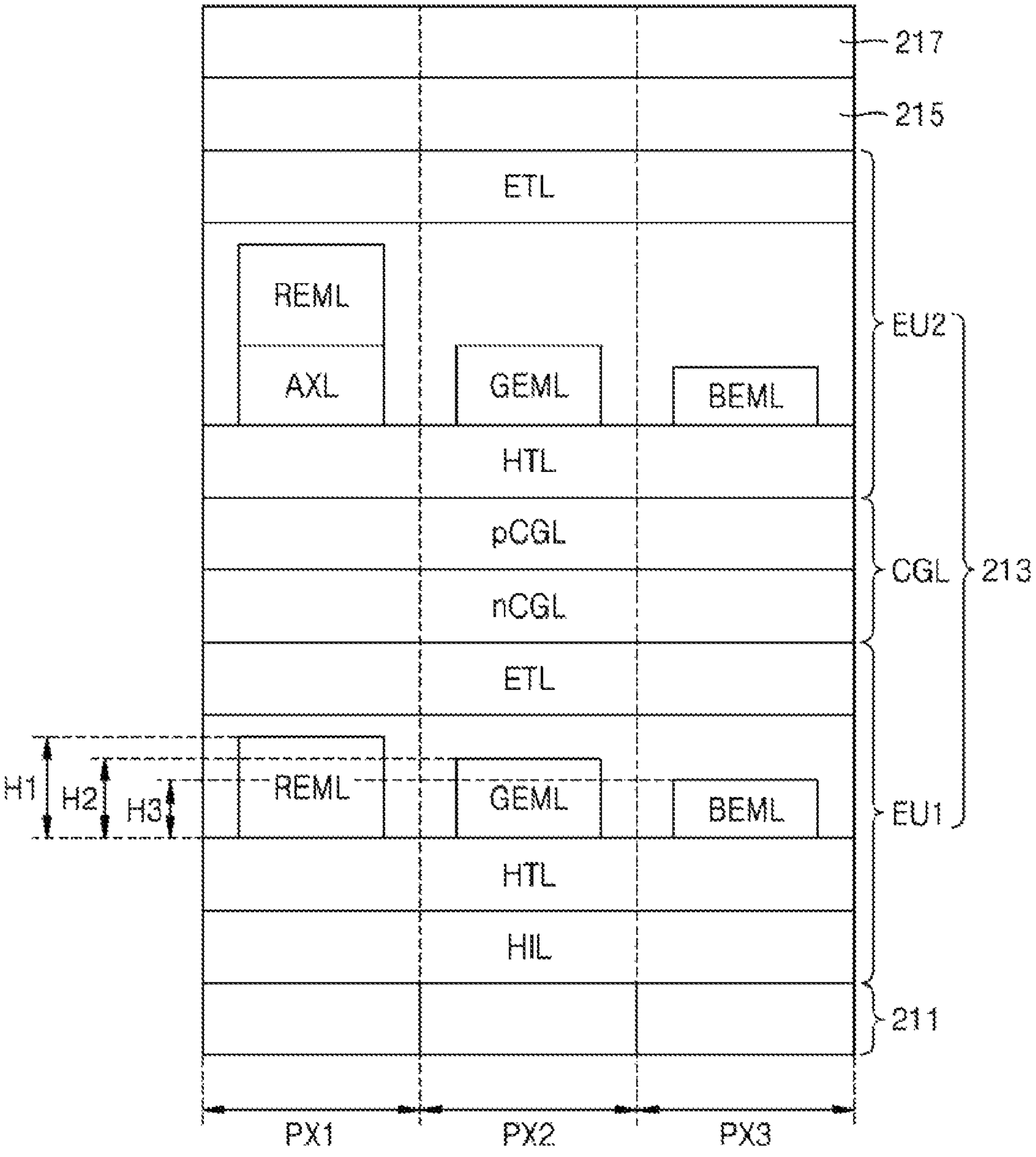

FIG. 15 is a schematic cross-sectional view of a structure of the pixel of the display apparatus according to an embodiment.

Referring to FIG. 15, the display apparatus may include pixels. The pixels may include the first pixel PX1, the second pixel PX2, and the third pixel PX3. The first pixel PX1, the second pixel PX2, and the third pixel PX3 may each include the pixel electrode 211, the opposite electrode 215, and the layer 213. In an embodiment, the first pixel PX1 may be a red pixel, the second pixel PX2 may be a green pixel, and the third pixel PX3 may be a blue pixel. For example, the pixel may include the organic light-emitting diode OLED as a display element, and the organic light-emitting diode OLED of each pixel may be electrically connected to the pixel circuit.

The pixel electrode 211 may be independently provided to each of the first pixel PX1, the second pixel PX2, and the third pixel PX3.

The layer 213 of the organic light-emitting diode OLED of each of the first pixel PX1, the second pixel PX2, and the third pixel PX3 may include the first emitting part EU1, the second emitting part EU2, and the charge generation layer CGL between the first emitting part EU1 and the second emitting part EU2. The charge generation layer CGL may include a negative charge generation layer nCGL and a positive charge generation layer pCGL. The charge generation layer CGL may be a common layer continuously formed over the first pixel PX1, the second pixel PX2, and the third pixel PX3.

The first emitting part EU1 of the first pixel PX1 may include the hole injection layer HIL, the hole transport layer HTL, the red emission layer REML, and the electron transport layer ETL that may be sequentially stacked each other on the pixel electrode 211. The first emitting part EU1 of the second pixel PX2 may include the hole injection layer HIL, the hole transport layer HTL, the green emission layer GEML, and the electron transport layer ETL that may be sequentially stacked each other on the pixel electrode 211. The first emitting part EU1 of the third pixel PX3 may include the hole injection layer HIL, the hole transport layer HTL, the blue emission layer BEML, and the electron transport layer ETL that may be sequentially stacked each other on the pixel electrode 211. Each of the hole injection layer HIL, the hole transport layer HTL, and the electron transport layer ETL of the first emitting units EU1 may be a common layer continuously formed over the first pixel PX1, the second pixel PX2, and the third pixel PX3.

The second emitting part EU2 of the first pixel PX1 may include the hole transport layer HTL, an auxiliary layer AXL, the red emission layer REML, and the electron transport layer ETL that may be sequentially stacked each other on the charge generation layer CGL. The second emitting part EU2 of the second pixel PX2 may include the hole transport layer HTL, the green emission layer GEML, and the electron transport layer ETL that may be sequentially stacked each other on the charge generation layer CGL. The second emitting part EU2 of the third pixel PX3 may include the hole transport layer HTL, the blue emission layer BEML, and the electron transport layer ETL that may be sequentially stacked each other on the charge generation layer CGL. Each of the hole transport layer HTL, and the electron transport layer ETL of the second emitting units EU2 may be a common layer continuously formed over the first pixel PX1, the second pixel PX2, and the third pixel PX3. In an embodiment, the second emitting part EU2 of the first pixel PX1, the second pixel PX2, and the third pixel PX3 may further include at least one of the hole blocking layer and the buffer layer between the emission layer and the electron transport layer ETL.

A thickness H1 of the red emission layer REML, a thickness H2 of the green emission layer GEML, and a thickness H3 of the blue emission layer BEML may be determined according to a resonance distance. The auxiliary layer AXL is a layer added to adjust a resonance distance and may include a resonance auxiliary material. As an example, the auxiliary layer AXL and the hole transport layer HTL may include a same material.

Although it is shown in FIG. 15 that the auxiliary layer AXL is provided to only the first pixel PX1, the embodiment is not limited thereto. As an example, the auxiliary layer AXL may be provided to at least one of the first pixel PX1, the second pixel PX2, and the third pixel PX3 to adjust a resonance distance of each of the first pixel PX1, the second pixel PX2, and the third pixel PX3.

The display apparatus may further include a capping layer 217 disposed on the outer surface of the opposite electrode 215. The capping layer 217 may be configured to improve a light-emission efficiency based on a constructive interference principle. Accordingly, a light extraction efficiency of the organic light-emitting diode OLED may be increased, and thus, a light emission efficiency of the organic light-emitting diode OLED may be improved.

According to the embodiments, the display apparatus with an improved display quality may be provided. However, the scope of the disclosure is not limited by this effect.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A display apparatus including a plurality of pixels, wherein each of the plurality of pixels includes:

a light-emitting diode;

a first transistor electrically connected to a driving voltage line and the light-emitting diode;

a second transistor electrically connected to the first transistor and the light-emitting diode;

a third transistor electrically connected to the second transistor and a first initialization voltage line; and a fourth transistor electrically connected to the light-emitting diode and a second initialization voltage line, and wherein:

during a frame, each of the plurality of pixels operates in a first scan period and a second scan period, wherein the first scan period includes a write-period in which a data signal is supplied and a first emission period in which each of the plurality of pixels is configured to emit light at a brightness corresponding to the data signal, wherein the second scan period includes a second emission period in which the data signal is maintained and each of the plurality of pixels is configured to emit light at a brightness corresponding to the data signal, during the second scan period, the third transistor is supplied with a first initialization voltage from the first initialization voltage line, and the fourth transistor is supplied with a second initialization voltage from the second initialization voltage line, and during the second scan period, a magnitude of the first initialization voltage and a magnitude of the second initialization voltage are equal to a first voltage.

2. The display apparatus of claim 1, wherein during the first scan period, the magnitude of the first initialization voltage is a second voltage, and, during the first scan period, the magnitude of the second initialization voltage is a third voltage, and a magnitude of the second voltage is different from a magnitude of the third voltage.

3. The display apparatus of claim 2, wherein, during the second scan period, the first voltage, which is the magnitude of each of the first initialization voltage and the second initialization voltage, is between the second voltage and the third voltage.

4. The display apparatus of claim 1, wherein, during a first period between the write-period and the first emission period, each of the plurality of pixels is configured to receive a second gate signal of an on-voltage through a gate of the third transistor and a gate of the fourth transistor.

5. The display apparatus of claim 1, wherein a second gate signal of a gate-on voltage is supplied to gates of the third transistor and the fourth transistor in a second period before the second emission period during the second scan period.

6. The display apparatus of claim 1, wherein each of the plurality of pixels further includes a fifth transistor electrically connected to a data line and to a gate of the first transistor, and during the write-period, a third gate signal of a gate-on voltage is supplied to a gate of the fifth transistor.

7. The display apparatus of claim 1, wherein each of the plurality of pixels further includes:

a sixth transistor electrically connected to the driving voltage line and the first transistor; and a seventh transistor electrically connected to a gate of the first transistor and a reference voltage line, and in a third period before the write-period during the first scan period, a first gate signal of a gate off-voltage is supplied to a gate of the second transistor, a fourth gate signal of a gate-on voltage is supplied to a gate of the sixth transistor, and a fifth gate signal of a gate-on voltage is supplied to a gate of the seventh transistor.

8. The display apparatus of claim 1, wherein, during the second scan period, a first gate signal of a gate-on voltage is supplied to a gate of the second transistor.

9. The display apparatus of claim 8, wherein each of the plurality of pixels further includes a sixth transistor electrically connected to the driving voltage line and the first transistor, a fourth gate signal of a gate-on voltage is supplied to a gate of the sixth transistor in the second emission period during the second scan period, and a fourth gate signal of a gate off-voltage is supplied to a gate of the sixth transistor in a period other than the second emission period.

10. The display apparatus of claim 9, wherein the plurality of pixels include:

a first pixel configured to emit light of a first color; and a second pixel configured to emit light of a second color, and magnitudes of a first initialization voltage and a second initialization voltage supplied to the first pixel are different from magnitudes of a first initialization voltage and a second initialization voltage supplied to the second pixel.

11. The display apparatus of claim 8, wherein each of the plurality of pixels further includes a sixth transistor electrically connected to the driving voltage line and the first transistor, and a fourth gate signal of a gate-on voltage is supplied to a gate of the sixth transistor during the second scan period.

12. The display apparatus of claim 11, wherein the plurality of pixels include a first pixel configured to emit light of a first color, and a second pixel configured to emit light of a second color, and magnitudes of a first initialization voltage and a second initialization voltage supplied to the first pixel are different from magnitudes of a first initialization voltage and a second initialization voltage supplied to the second pixel.

13. The display apparatus of claim 1, further comprising:

a sixth transistor electrically connected to the driving voltage line and the first transistor;

wherein a fourth gate signal of a gate-on voltage is supplied to a gate of the sixth transistor during the second scan period.

14. The display apparatus of claim 13, wherein a first gate signal of a gate-on voltage is supplied to a gate of the second transistor in the second emission period during the second scan period, and a first gate signal of a gate-off voltage is supplied to a gate of the second transistor in a period other than the second emission period.

15. The display apparatus of claim 1, further comprising a power supply circuit configured to output an initialization voltage of a constant magnitude to the plurality of pixels through the first initialization voltage line and the second initialization voltage line.

16. A method of driving a pixel, wherein the pixel includes:

a light-emitting diode;

a first transistor electrically connected to a driving voltage line and the light-emitting diode;

a second transistor electrically connected to the first transistor and the light-emitting diode;

a third transistor electrically connected to the second transistor and a first initialization voltage line; and a fourth transistor electrically connected to the light-emitting diode and a second initialization voltage line, and wherein a frame includes:

a first scan period including a write-period in which a data signal is supplied and a first emission period in which the pixel is configured to emit light at a brightness corresponding to the data signal; and a second scan period including a second emission period in which the data signal is maintained and the pixel is configured to emit light at a brightness corresponding to the data signal, the method comprising:

supplying a first gate signal of a gate-on voltage to a gate of the second transistor during the second scan period, supplying a first initialization voltage from the first initialization voltage line to a third transistor, supplying a second initialization voltage from the second initialization voltage line during the second scan period to a fourth transistor, wherein a magnitude of the first initialization voltage and a magnitude of the second initialization voltage are equal to a first voltage during the second scan period.

17. The method of claim 16, wherein the pixel further includes a sixth transistor electrically connected to the driving voltage line and the first transistor, the method further comprises:

supplying a third gate signal of a gate-on voltage to a gate of the sixth transistor in the second emission period during the second scan period, and supplying a third gate signal of a gate-off voltage to a gate of the sixth transistor in a period other than the second emission period.

18. The method of claim 16, further comprising supplying a second gate signal of a gate-on voltage to a gate of the third transistor and a gate of the fourth transistor in a first period between the write-period and the first emission period during the first scan period.

19. The method of claim 16, wherein a magnitude of the first initialization voltage is a second voltage during the first scan period, a magnitude of the second initialization voltage is a third voltage during the first scan period, and the second voltage is different from the third voltage.

20. The method of claim 19, wherein, during the second scan period, the first voltage, which is the magnitude of each of the first initialization voltage and the second initialization voltage, is between the second voltage and the third voltage.

* * * * *